(12) United States Patent
Bevirt et al.

(10) Patent No.: US 12,448,123 B2
(45) Date of Patent: Oct. 21, 2025

(54) ELECTRIC TILTROTOR AIRCRAFT

(71) Applicant: Joby Aero, Inc., Santa Cruz, CA (US)

(72) Inventors: JoeBen Bevirt, Santa Cruz, CA (US); Edward Stilson, Santa Cruz, CA (US); Alex Stoll, Santa Cruz, CA (US); Gregor Veble Mikic, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/674,926

(22) Filed: May 27, 2024

(65) Prior Publication Data

US 2025/0033768 A1     Jan. 30, 2025

Related U.S. Application Data

(63) Continuation of application No. 17/170,672, filed on Feb. 8, 2021, now Pat. No. 11,993,369, which is a continuation of application No. 16/409,653, filed on May 10, 2019, now Pat. No. 10,974,827.

(60) Provisional application No. 62/669,874, filed on May 10, 2018.

(51) Int. Cl.
*B64C 29/00* (2006.01)
*B64C 11/46* (2006.01)
*B64D 27/31* (2024.01)
*B64D 27/34* (2024.01)

(52) U.S. Cl.
CPC .......... *B64C 29/0033* (2013.01); *B64C 11/46* (2013.01); *B64D 27/31* (2024.01); *B64D 27/34* (2024.01)

(58) Field of Classification Search
CPC .................................................. B64C 29/0033
See application file for complete search history.

(56) References Cited

U.S. PATENT DOCUMENTS

| 3,059,876 | A | * | 10/1962 | Platt | ............. | B64C 29/0033 |
| | | | | | | 244/7 C |
| 3,136,499 | A | * | 6/1964 | Kessler | ............. | B64C 11/34 |
| | | | | | | 244/7 C |
| 3,141,633 | A | * | 7/1964 | MacKay | ............. | B64C 29/0033 |
| | | | | | | 244/7 C |

(Continued)

FOREIGN PATENT DOCUMENTS

EP        4134301 A1 *  2/2023   ......... B64C 29/0033

*Primary Examiner* — Joseph W Sanderson
(74) *Attorney, Agent, or Firm* — Michael A. Guth

(57) ABSTRACT

An aircraft including an airframe and a plurality of propulsion assemblies coupled to the airframe, wherein each propulsion assembly includes an electric motor, a propeller coupled to the electric motor, and a tilt mechanism that connects the propulsion assembly to the airframe and transforms the propulsion assembly between a forward configuration and a hover configuration; wherein the plurality of propulsion assemblies is transformable between a forward arrangement and a hover arrangement, wherein each of the plurality of propulsion assemblies is in the forward configuration in the forward arrangement, wherein each of the plurality of propulsion assemblies is in the hover configuration in the hover arrangement, wherein the spacing between at least two of the propellers of the plurality of propulsion assemblies changes between the forward arrangement and the hover arrangement.

14 Claims, 13 Drawing Sheets

(56) References Cited

U.S. PATENT DOCUMENTS

| | | | | |
|---|---|---|---|---|
| 3,159,361 A * | 12/1964 | Weiland | ............ | B60V 1/14 |
| | | | | 180/117 |
| 3,592,412 A * | 7/1971 | Glatfelter | ............ | B64C 29/0033 |
| | | | | 416/142 |
| 8,733,690 B2 * | 5/2014 | Bevirt | ............ | B64C 29/0033 |
| | | | | 244/17.23 |
| 9,475,579 B2 * | 10/2016 | Fredericks | ............ | B64U 70/80 |
| 9,694,911 B2 * | 7/2017 | Bevirt | ............ | B64C 39/068 |
| 9,975,631 B1 * | 5/2018 | McLaren | ............ | B64C 11/28 |
| 10,046,855 B2 * | 8/2018 | Bevirt | ............ | B64D 27/357 |
| 10,144,503 B1 * | 12/2018 | Vander Lind | ............ | B64C 29/0033 |
| 10,183,746 B2 * | 1/2019 | McCullough | ............ | B64D 25/12 |
| 10,315,760 B2 * | 6/2019 | Bevirt | ............ | B64C 29/0033 |
| 10,513,334 B2 * | 12/2019 | Groninga | ............ | B64C 39/08 |
| 10,589,854 B2 * | 3/2020 | Alber | ............ | B64C 29/0033 |
| 10,625,852 B2 * | 4/2020 | Bevirt | ............ | B64C 27/28 |
| 10,974,827 B2 * | 4/2021 | Bevirt | ............ | B64C 11/46 |
| 10,983,534 B2 * | 4/2021 | English | ............ | G05D 1/102 |
| 11,091,258 B2 * | 8/2021 | Groninga | ............ | B64C 15/02 |
| 11,993,369 B2 * | 5/2024 | Bevirt | ............ | B64C 27/28 |
| 12,199,305 B2 * | 1/2025 | Villanueva | ............ | H01M 50/249 |
| 2015/0266571 A1 * | 9/2015 | Bevirt | ............ | B64D 27/357 |
| | | | | 244/7 C |
| 2016/0031555 A1 * | 2/2016 | Bevirt | ............ | B64C 27/30 |
| | | | | 244/7 C |
| 2016/0031556 A1 * | 2/2016 | Bevirt | ............ | B64C 11/10 |
| | | | | 416/131 |
| 2016/0244158 A1 * | 8/2016 | Fredericks | ............ | B64C 3/40 |
| 2016/0304194 A1 * | 10/2016 | Bevirt | ............ | B64C 11/28 |
| 2017/0101176 A1 * | 4/2017 | Alber | ............ | B64C 3/32 |
| 2018/0065739 A1 * | 3/2018 | Vondrell | ............ | B64D 27/24 |
| 2018/0354615 A1 * | 12/2018 | Groninga | ............ | B64C 3/385 |
| 2019/0127061 A1 * | 5/2019 | McLaren | ............ | B64C 27/30 |
| 2020/0391862 A1 * | 12/2020 | Groninga | ............ | B64C 29/0033 |
| 2021/0391627 A1 * | 12/2021 | Villanueva | ............ | B64C 1/16 |
| 2022/0306292 A1 * | 9/2022 | Ross | ............ | B64C 39/08 |
| 2023/0137714 A1 * | 5/2023 | Bevirt | ............ | B64C 27/28 |
| | | | | 244/17.23 |

* cited by examiner hover arrangement forward arrangement hover arrangement forward arrangement

ELECTRIC TILTROTOR AIRCRAFT

CROSS REFERENCE TO RELATED APPLICATIONS

This application is a continuation of U.S. application Ser. No. 17/170,672, filed 8 Feb. 2019, which is a continuation of U.S. application Ser. No. 16/409,653, filed 10 May 2019, which claims the benefit of U.S. Provisional Application No. 62/669,874, filed 10 May 2018, each of which is incorporated herein in its entirety by this reference.

TECHNICAL FIELD

This invention relates generally to the aviation field, and more specifically to a new and useful aircraft in the aviation field.

BACKGROUND

Tradeoffs exist between rotary-wing aircraft (e.g., helicopters) and fixed-wing aircraft. While helicopters are capable of vertical take-off and landing (VTOL) and hover, fixed-wing aircraft can operate more efficiently over longer distance travel and can often travel at higher speeds. Tiltrotor aircraft (i.e., aircraft that can transition between operating primarily as a rotary-wing aircraft and primarily as a fixed-wing aircraft using the same propulsion system) can advantageously combine certain aspects of rotary-wing operation (e.g., VTOL and hover capability) and fixed-wing operation; however, conventional approaches to tiltrotor configurations suffer from several disadvantages. For example, tiltrotor aircraft with mechanical powertrains often require complex mechanical power transmission between the powerplant (e.g., located within the fuselage of the aircraft) and the propulsion system (e.g., rotors or propellers located distal to the powerplant at the exterior of the aircraft); this can increase the weight and complexity of the aircraft. Due to the increased complexity, conventional approaches to tiltrotor aircraft often restrict the number of propulsion units (e.g., rotors, propellers, turbomachinery, etc.), which in turn increases the risk of loss of vehicle control (LoC) in a one-engine-inoperative (OEI) or other emergency propulsion-related condition during flight. Conventional tiltrotor aircraft can also be susceptible to other disadvantages.

Thus, there is a need in the aviation field to create a new and useful tiltrotor aircraft. This invention provides such a new and useful tiltrotor aircraft.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1A:
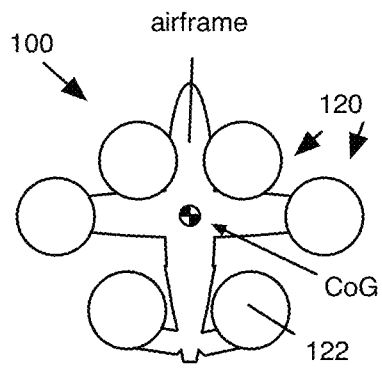
FIGS. 1A-1B depict schematic illustrations of a top view of a variation of the aircraft in a hover configuration and a forward configuration, respectively.
Figure 1B:
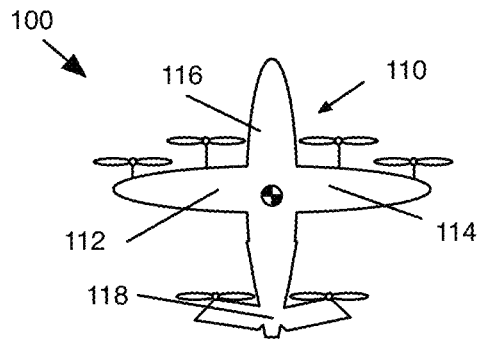

As shown in FIGS. 1A-1B, the tiltrotor aircraft 100 includes an airframe and a plurality of propulsion assemblies coupled to the airframe. The aircraft 100 is operable between a hover mode, wherein the plurality of propulsion assemblies 120 is arranged in a hover arrangement, and a forward mode, wherein the plurality of propulsion assemblies 120 is arranged in a forward arrangement. The hover arrangement defines the position of each propeller 122 of the plurality of propulsion assemblies 120 relative to each other propeller 122 of the plurality of propulsion assemblies 120 and the airframe 110 during aircraft 100 operation in the hover mode, and the forward arrangement likewise defines the relative position of each propeller 122 to each other propeller 122 and the airframe 110 during operation in the forward mode. The airframe 110 can include a left wing 112, a right wing 114, a fuselage 116, and an empennage 118, wherein the left and right wings are coupled to the fuselage 116 and positioned between forward of the empennage 118. Each propulsion assembly 120 includes a propeller, a tilt mechanism, and an electric motor. Each propulsion assembly 120 is operable, preferably by the tilt mechanism 124 associated therewith but alternatively in any other suitable manner, between a hover configuration and a forward configuration as described in further detail below. The tiltrotor aircraft 100 can additionally include an electric power source, flight control surfaces 142 and actuators, and any other suitable components.

The tiltrotor aircraft 100 defines a center of gravity (CoG). The center of gravity is preferably a point in three-dimensional space from which the weight of the tiltrotor aircraft 100 can be considered to act, but can alternatively be a defined as a region having a finite volume, a set of points defining the CoG in various aircraft 100 loading configurations, and/or be otherwise suitably defined. The center of gravity can depend upon the state or arrangement of mass of the aircraft 100 (e.g., loaded vs. empty, the weight distribution of cargo and/or passengers, the tilt configuration of the propellers, etc.), and references to the CoG herein preferably refer to the aircraft 100 CoG in an unloaded state (e.g., empty state) and in the hover arrangement of the plurality of propellers, but can additionally or alternatively refer to a loaded state, a forward-arranged state, and any other suitable state of the aircraft 100.

Figure 2A:
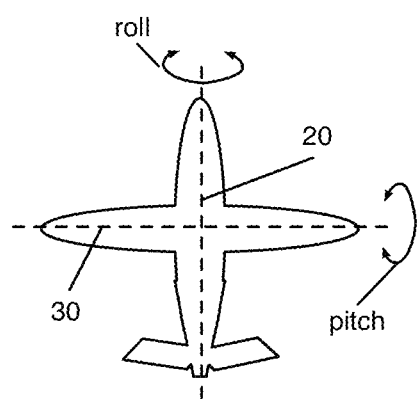
FIG. 2A depicts a top view of a variation of a portion of the aircraft and example principal axes including the longitudinal axis and the lateral axis.
Figure 2B:
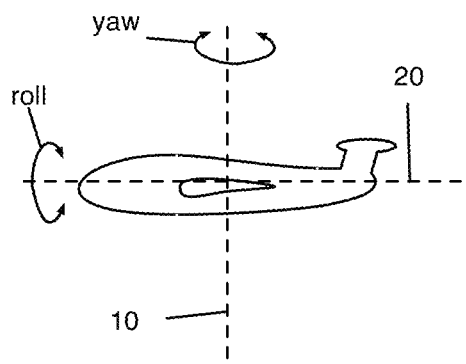
FIG. 2B depicts a side view of a variation of a portion of the aircraft and example principal axes including the longitudinal axis and the vertical axis.

The tiltrotor aircraft 100 defines various geometrical features. The tiltrotor aircraft 100 defines principal geometric axes, as shown in FIGS. 2A-2B, including: a vertical axis (e.g., yaw axis 10), a longitudinal axis (e.g., a roll axis 20), and a lateral axis (e.g., a pitch axis 30). The vertical, longitudinal, and lateral axes can be defined such that they intersect at the CoG of the aircraft 100, and a pure moment about any one of the aforementioned axes causes the aircraft 100 to rotate about the vertical, longitudinal, and lateral axes, respectively. However, the three principal axes can additionally or alternatively be defined geometrically (e.g., based on lines of symmetry of the aircraft 100 in one or more dimensions, based on arbitrary lines through the aircraft 100, etc.) with or without reference to the CoG. For example, the axes can intersect at a geometric center of the aircraft 100. The propellers of the tiltrotor aircraft 100 each define a disc area centered at the axis of rotation of the propeller, and the disc area is contained by an infinite disc plane extending away from the axis of rotation. In variations of the aircraft 100, the disc planes of each of the plurality of propulsion assemblies 120 can be coextensive with any suitable subset of the remainder of the plurality of propulsion assemblies 120; in a first example, each disc plane can be coextensive with each other disc plane in the hover configuration of a first variation; in a second example, each disc plane can be coextensive with the disc plane of one other propulsion assembly 120 symmetrically across the longitudinal axis of the aircraft 100 and displaced from the disc planes of each other propulsion assembly 120; however, the disc planes of the plurality of propulsion assemblies 120 can be otherwise suitably arranged relative to one another.

The tiltrotor aircraft 100 functions to provide an aerial vehicle operable between a hover mode (e.g., rotary-wing mode) and a forward mode (e.g., fixed-wing mode). The hover mode can include vertical takeoff, vertical landing, and/or substantially stationary hovering of the aircraft 100; however, the hover mode can additionally or alternatively include any suitable operating mode wherein vertically-directed thrust is generated by one or more of the plurality of propulsion assemblies 120. The forward mode can include forward flight, horizontal takeoff, and/or horizontal landing of the aircraft 100 (e.g., conventional take-off and landing/CTOL); however, the forward mode can additionally or alternatively include any suitable operating mode wherein horizontally-directed thrust is generated by one or more of the plurality of propulsion assemblies 120. Thus, the hover mode and forward mode are not mutually exclusive, and the tiltrotor aircraft 100 can operate in a superposition of the hover mode and the forward mode (e.g., wherein the plurality of propulsion assemblies 120 is arranged in a superposition of the hover arrangement and the forward arrangement defined by a liminal configuration of each of the plurality of propulsion assemblies 120 between the hover configuration and the forward configuration). The tiltrotor aircraft 100 can also function to provide an aerial vehicle that is stable in hover mode (e.g., maximally stable, stable within a defined stability window or envelope of flight conditions, stable up to a stability threshold magnitude of various control inputs to the aircraft 100, etc.) and efficient (e.g., aerodynamically efficient, power efficient, thermodynamically efficient, etc.) in forward mode. The tiltrotor aircraft 100 can also function to provide airborne transportation to passengers and/or cargo. However, the tiltrotor aircraft 100 can additionally or alternatively have any other suitable function.

The tiltrotor aircraft 100 is operable between a plurality of modes, including a hover mode and a forward mode. In the hover mode, the plurality of propulsion assemblies 120 can be arranged in the hover arrangement. In the hover arrangement, each of the plurality of propellers is preferably arranged in the hover configuration. In the forward mode, the plurality of propulsion assemblies 120 can be arranged in the forward arrangement. In the forward arrangement, each of the plurality of propellers is preferably arranged in the forward configuration. However, each of the plurality of propellers can be arranged in any suitable state between the forward and hover configurations, independently of one another, and/or in any suitable orientation in the hover mode of aircraft 100 operation; furthermore, each of the plurality of propellers can be arranged in any suitable state between the forward and hover configurations, independently of one another, and/or in any other suitable orientation in the forward mode of aircraft 100 operation. Furthermore, the tiltrotor aircraft 100 can be operated in any suitable liminal mode between the hover mode and forward mode, wherein a component of thrust generated by one or more propulsion assemblies 120 is directed along both the vertical axis and the longitudinal axis (e.g., and/or the lateral axis).

Though the aircraft 100 is referred to herein as a tiltrotor aircraft 100, the terms "propeller" and "rotor" as utilized herein can refer to any suitable rotary aerodynamic actuator, commonly referred to as a rotor, a propeller, a rotating wing, a rotary airfoil, and the like. While a rotor can refer to a rotary aerodynamic actuator that makes use of an articulated or semi-rigid hub (e.g., wherein the connection of the blades to the hub can be articulated, flexible, rigid, and/or otherwise connected), and a propeller 122 can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of propeller 122 can refer to either configuration, and any other possible configuration of articulated or rigid blades, and/or any other possible configuration of blade connections to a central member or hub. Accordingly, the tiltrotor aircraft 100 can be referred to as a tilt-propeller 122 aircraft 100, a tilt-prop aircraft 100, and/or otherwise suitably referred to or described. In the context of an electric motor, which in some variations can include a stator and rotor, the rotor of the electric motor 126 can refer to the portion of the motor that rotates as electrical potential energy is converted to rotational kinetic energy in operation of the electric motor.

Figure 3:
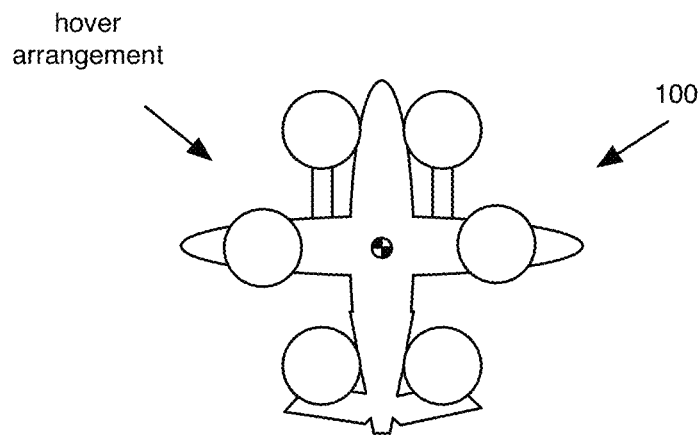
FIG. 3 depicts an example substantially symmetric hover arrangement of the plurality of propellers of the aircraft.

The tiltrotor aircraft 100 is preferably configured to optimize the hover arrangement for hover mode performance, and to optimize the forward arrangement for forward mode performance, using the same plurality of propellers; however, in alternative configurations, the tiltrotor aircraft 100 can include a subset of the plurality of propellers that is utilized solely during hover mode operation and another subset that is utilized solely during forward mode operation. The optimal arrangement of the propellers in each mode can include displacing the position of the centroid of each propeller's disc area (e.g., a point along the propeller 122 axis) at least partially along axes parallel to at least one of the longitudinal axis and the lateral axis of the aircraft 100 in transitioning between the hover arrangement and the forward arrangement. For example, the desired hover arrangement can include six propeller discs arranged in a hexagonal configuration, wherein each disc area centroid is substantially equidistant from the CoG of the aircraft 100 as at least one other disc area reflected across the roll or pitch axes of the aircraft 100 (e.g., as shown in FIGS. 1A and 3), whereas the desired forward arrangement can include the six propeller discs rotated 90° (e.g., such that the rotation axes of each propeller 122 are substantially parallel to the longitudinal axis) and translated toward the portion of the airframe 110 to which they are attached at the propulsion assembly attachment points (e.g., as shown in FIG. 1B). However, the arrangement of the propellers in each mode (e.g., the forward arrangement, the hover arrangement, etc.) can additionally or alternatively include or omit translation of any of the plurality of propellers.

In a first variation of the aircraft 100, as shown by example in FIG. 1A, the hover arrangement includes the plurality of propellers (e.g., of the plurality of propulsion assemblies 120) arranged substantially symmetrically (e.g., perfectly symmetrically, nearly symmetrically, etc.) in a pairwise manner about the aircraft 100 CoG, and the forward arrangement of the plurality of propellers is not symmetric about the CoG. In a related variation, the hover arrangement includes pairwise arrangement of the plurality of propellers such that each propeller 122 corresponds to a second propeller 122 equidistant from the CoG (e.g., a nominal CoG, a measured CoG at a point in time, etc.) along a vector having a component in both the longitudinal and lateral directions (e.g., to minimize propulsion assembly 120 thrust requirements in a state of the aircraft 100 wherein one propulsion assembly 120 is inoperative). In another variation, the hover arrangement includes an asymmetric arrangement of the propellers about the CoG of the aircraft 100. The forward arrangement of the plurality of propellers can be symmetric or asymmetric about the CoG, and is preferably arranged relative to a center of pressure (e.g., relative a range of centers of pressure in various flight conditions) to optimize stability and/or controllability in forward flight. In additional or alternative variations, the aforementioned arrangements can be embodied relative to a geometric center of the aircraft 100 instead of a CoG of the aircraft 100.

2. Benefits

The tiltrotor aircraft 100 and variations thereof can afford several benefits and/or advantages.

Figure 17A:
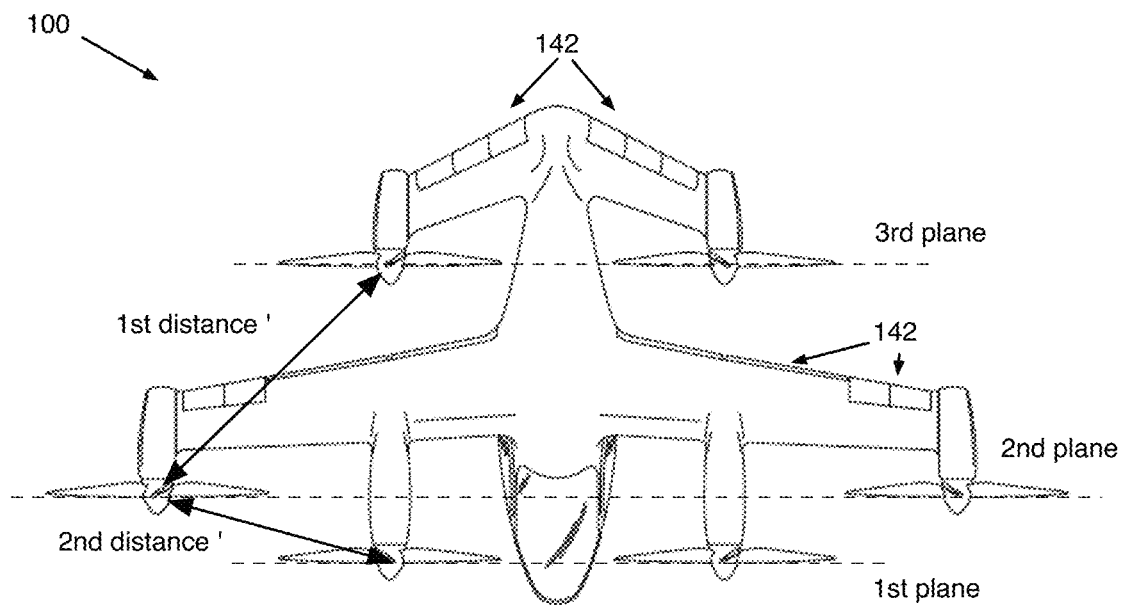
FIGS. 17A-B depict overhead views of an example embodiment of the aircraft in variations of the forward and hover arrangements, respectively.
Figure 17B:
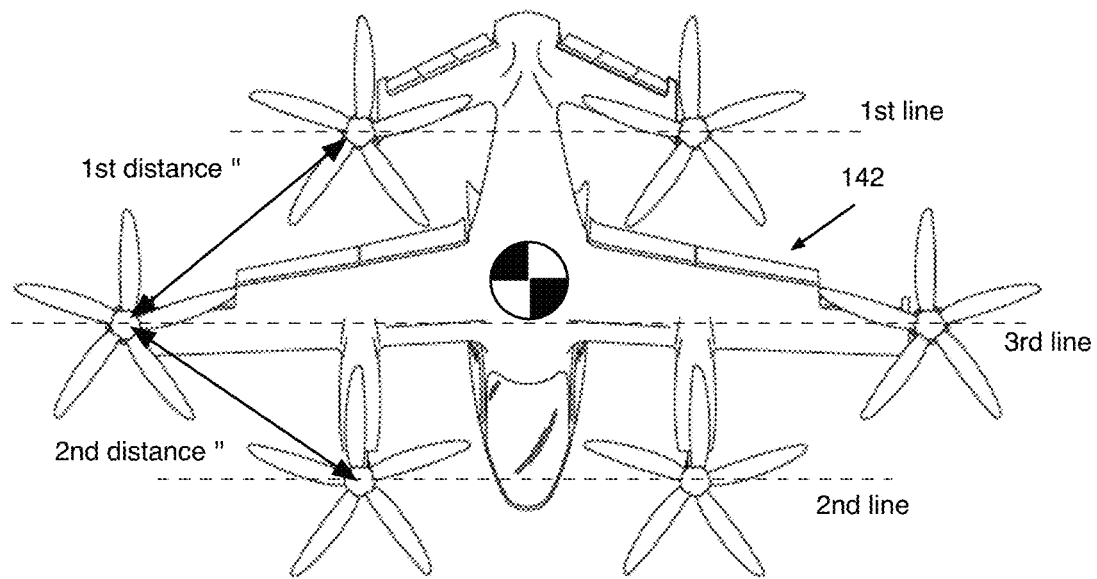

First, variations of the tiltrotor aircraft 100 can enable efficient and safe handling of a one-engine-inoperative (OEI) condition by reducing the power requirement of the operating motor with the greatest load in an OEI condition. It is advantageous to utilize the same electric motor 126 for each propulsion assembly 120, and thus to arrange the propulsion assemblies 120 such that any single failure does not require one of the remaining propulsion assemblies 120 to operate at a higher power than the other remaining propulsion assemblies 120. For example, in a case wherein the aircraft 100 includes six propulsion assemblies 120 and one fails (e.g., provides zero thrust, becomes uncontrollable, etc.), it is preferable operate five motors at 140% power than to operate one motor at 200% power and the other remaining four at 120% power. In the latter hypothetical design paradigm, each motor would require sufficient capability to operate at 200% of nominal power, rather than the former case where each motor would have to be capable of only 140% of nominal power; therefore, in the latter case, the total motor weight would be greater than that of the former case, even though the total power produced by the remaining motors would be lower. Thus, to reduce the hover power requirements of the remaining motor which is working the hardest for any possible OEI case (that is, if any single motor of the plurality of propulsion assemblies 120 was inoperative), the propulsion assembly 120 layouts of such variations are preferably such that each propeller 122 pair is symmetric about the CoG in the hover arrangement (i.e., substantially equidistant from the CG and 180° apart). Such layouts can include arrangements wherein all propeller 122 pairs are equidistant from the CoG, and/or arrangements wherein each propeller 122 of each pair is equidistant from the CoG with respect to its corresponding propeller 122 of the pair but each propeller 122 pair can be at a different distance from the CoG (e.g., as shown in FIG. 17B).

For example, the tiltrotor aircraft 100 can include a number (e.g., three or greater) of substantially identical electrically powered propellers arranged about the aircraft 100 CoG (e.g., wherein each propeller 122 is equidistant from the CoG, nearly equidistant, pairwise equidistant, etc.) such that the power requirement for over-throttling of the remaining motors in an OEI state is minimized (e.g., versus a configuration in which the electric motors are not independent and/or identical). This capability can also reduce the maximum power requirement of each motor, which can reduce the size and/or weight and thereby enhance aircraft 100 performance (e.g., range, speed, mass budget available for battery mass, marginal mass reduction, etc.). This capability can also enhance the ability to use instances of the same motor (e.g., identical motor designs, substantially similar motors, etc.) for each propulsion assembly 120 of the plurality of propulsion assemblies 120 (e.g., to reduce overall system complexity). The arrangement of the propulsion assemblies 120 in relation to the aircraft 100 geometry preferably supports the above OEI-condition performance capacity; for example, in the hover arrangement of the aircraft 100, the distribution of propulsion assemblies 120 is preferably such that at least three propulsion assemblies 120 are arranged on each side of the pitch axis 30 and each side of the roll axis 20 (e.g., wherein loss of any one propulsion assembly 120 results in at least two operable propulsion assemblies 120 on either side of each of the roll axis 20 and the pitch axis 30 to preserve control authority using thrust differential in the OEI state).

Second, variations of the tiltrotor aircraft 100 can enable optimal flight performance (e.g., stability, controllability, responsivity, operability in an OEI condition, etc.) both during operation in hover mode (e.g., via symmetric or nearly symmetric arrangement of propellers in the hover arrangement, pairwise symmetric arrangement of propellers across the geometric axes of the aircraft 100, etc.) and during operation in forward mode (e.g., via transitioning of the propulsion assemblies 120 to the desired arrangement for forward flight based on the center of pressure of the aircraft 100).

Third, variations of the tiltrotor aircraft 100 can utilize a combination of pivoting tilt mechanisms (e.g., pivots) and linkage tilt mechanisms (e.g., linkages) to efficiently transition between the desired hover arrangement and the desired forward arrangement. The use of both pivots and linkages can enable a wide range of available wing geometries for the aircraft 100 while also enabling a wide range of possible hover and forward arrangements. Pivots can provide mechanical simplicity (e.g., a reduced part count, a reduced number of degrees of freedom, etc.) while enabling transition between the forward and hover configurations, and linkages can enable flexibility in translation of the disc area during transition between the hover and forward configurations to achieve the desired geometry; the combination of pivots and linkages can enable minimal mechanical complexity while obtaining the desired geometry in both the hover and forward arrangements of the aircraft 100.

However, the tiltrotor aircraft 100 and variations thereof can additionally or alternatively afford any other suitable benefits and/or advantages.

3. System

As shown in FIGS. 1A-1B, the tiltrotor aircraft 100 100 includes an airframe 110 and a plurality of propulsion assemblies 120 coupled to the airframe 110. The aircraft 100 is operable between a hover mode, wherein the plurality of propulsion assemblies 120 is arranged in a hover arrangement, and a forward mode, wherein the plurality of propulsion assemblies 120 is arranged in a forward arrangement. The hover arrangement defines the position of each propeller 122 of the plurality of propulsion assemblies 120 relative to each other propeller 122 of the plurality of propulsion assemblies 120 and the airframe 110 during aircraft 100 operation in the hover mode, and the forward arrangement likewise defines the relative position of each propeller 122 to each other propeller 122 and the airframe 110 during operation in the forward mode. The airframe 110 can include a left wing 112, a right wing 114, a fuselage 116, and an empennage 118, wherein the left and right wings are coupled to the fuselage 116 and positioned between forward of the empennage 118. Each propulsion assembly 120 includes a propeller, a tilt mechanism, and an electric motor. Each propulsion assembly 120 is operable, preferably by the tilt mechanism 124 associated therewith but alternatively in any other suitable manner, between a hover configuration and a forward configuration as described in further detail below. The tiltrotor aircraft 100 can additionally include an electric power source, flight control surfaces 142 and actuators, and any other suitable components and/or elements.

3.1 Airframe

The airframe 110 functions to structurally support itself and other portions of the aircraft 100 during operation, under the influence of various structural stresses (e.g., aerodynamic forces, gravitational forces, propulsive forces, external point, distributed, and body forces, etc.). The airframe 110 can also function to define one or more internal lumens (e.g., three dimensional regions) adapted to house one or more pilots, one or more passengers, and/or any suitable quantity and type of cargo. The airframe 110 can also function to define one or more propulsion assembly attachment points. The airframe 110 can be composed of various materials suitable for aviation structures, such as aluminum alloys, steel alloys, composite materials, and any other suitable materials. The airframe 110 and components or portions thereof (e.g., the fuselage 116, wings, empennage 118, control surfaces, etc.) can also be coated (e.g., covered, paneled, clad, etc.) with various materials suitable for aero-wetted operation, such as aluminum, panels having any suitable coating (e.g., paint, low friction coatings, etc.), carbon fiber, composite materials, and any other suitable materials.

The airframe 110 includes a fuselage 116 that defines a nose end and a tail end. The nose end can refer to portions of the fuselage 116 forward of the wing, and the tail end can refer to portions of the fuselage 116 located aft of the wing. The tail can include a tail boom that connects to and structurally supports the empennage 118. The tail boom can extend aft from the trailing edge of the wing to the empennage 118, and the empennage 118 preferably extends upward from the tail boom. In particular, the vertical extent of the empennage 118 is preferably above the highest vertical extent of any other portion of the airframe 110, but can alternatively extend up to and/or below the highest vertical extent of a different portion of the airframe 110. In an alternative variation, the empennage 118 extends down from the tail boom (e.g., as an inverted V-tail). In another alternative variation, the empennage 118 extends laterally and vertically from the tail boom (e.g., as a conventional T-tail, an inverted T-tail, etc.).

Figure 4:
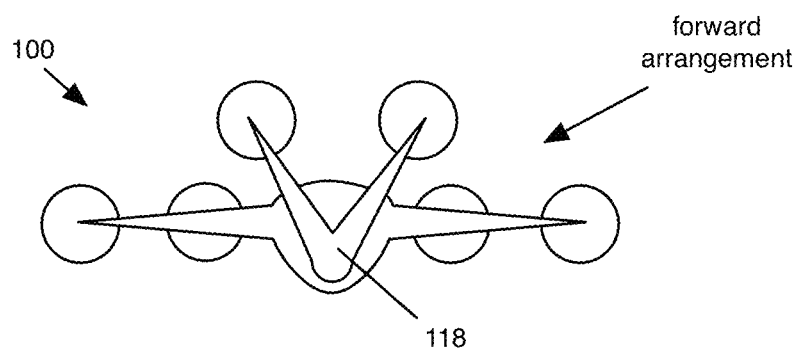
FIG. 4 depicts a view from the rear of a variation of the aircraft including a V-tail in the forward arrangement.
Figure 5:
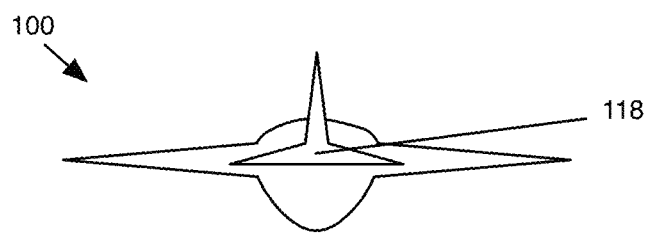
FIG. 5 depicts a view from the rear of a variation of a portion of the aircraft including a crossed horizontal and empennage.

In a variation, as shown in FIG. 4, the empennage 118 includes a V-tail (e.g., vee-tail) defining two propulsion assembly attachment locations, wherein each uppermost region of the V of the V-tail corresponds to a propulsion assembly attachment location. In this variation, the disc area of each of the two propellers is positioned substantially above the wing position in the forward arrangement of the aircraft 100 in the plane formed by the roll and yaw axes (e.g., from a side view of the aircraft 100), such that the tail propulsion assemblies 120 (e.g., the two propellers of the two propulsion assemblies 120 coupled to the tail, the rear propulsion assemblies 120, etc.) are substantially free from wake disturbances resulting from the upstream propellers, static and/or dynamic flight surfaces, and flight control surfaces. The empennage 118 can alternatively include a crossed vertical and horizontal stabilizer pair (e.g., a T-tail), as shown in FIG. 5, and include one or more propulsion assembly attachment points at any suitable location(s).

Figure 18A:
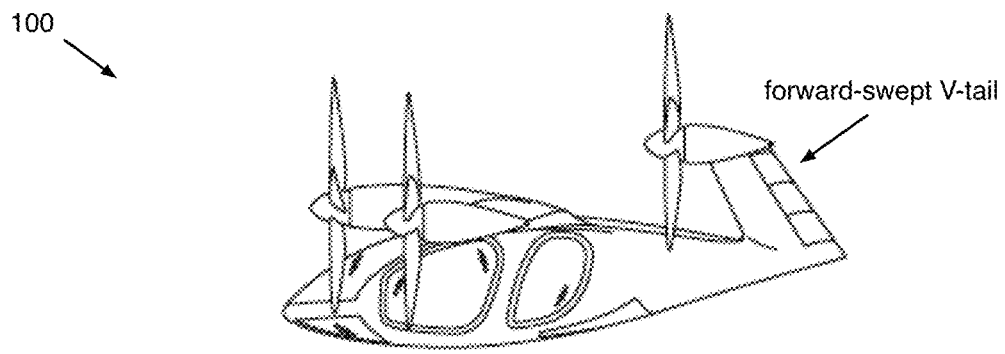
FIG. 18A depicts a side view of an example embodiment of the aircraft in a variation of the forward arrangement.
Figure 18B:
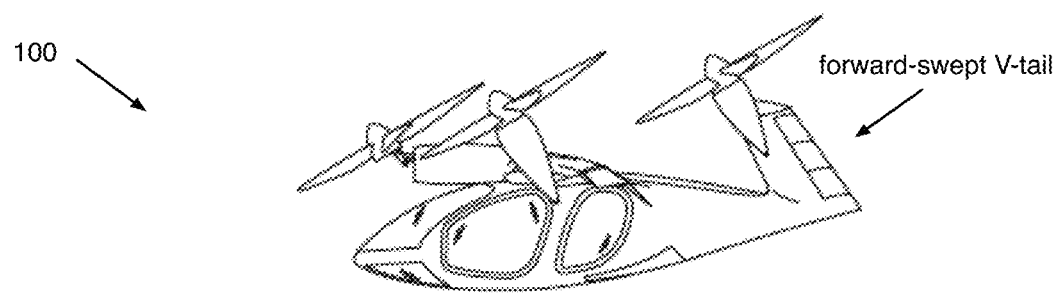
FIG. 18B depicts a side view of an example embodiment of the aircraft between a variation of the forward arrangement and the hover arrangement.
Figure 18C:
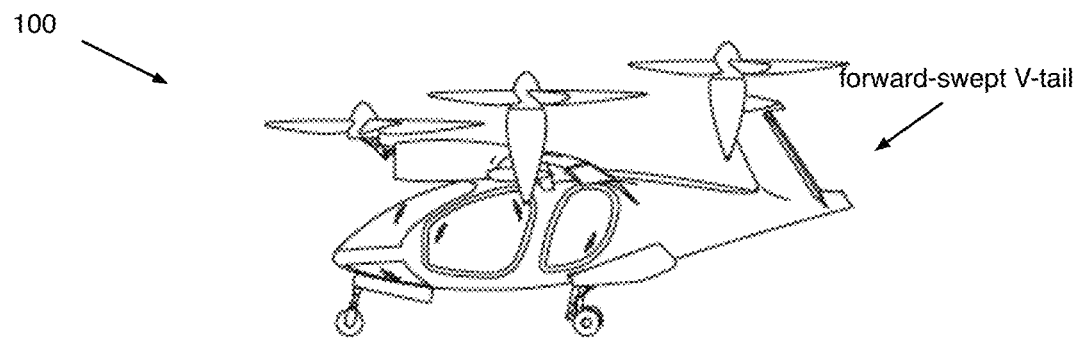
FIG. 18C depicts a side view of an example embodiment of the aircraft in a variation of the hover arrangement.
Figure 19A:
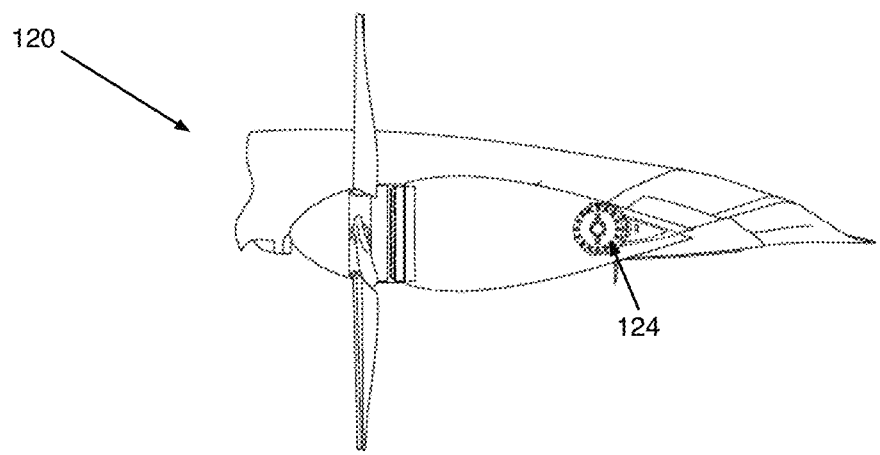
FIG. 19A depicts a variation of the propulsion assembly including a pivot tilt mechanism in a variation of the forward configuration.
Figure 19B:
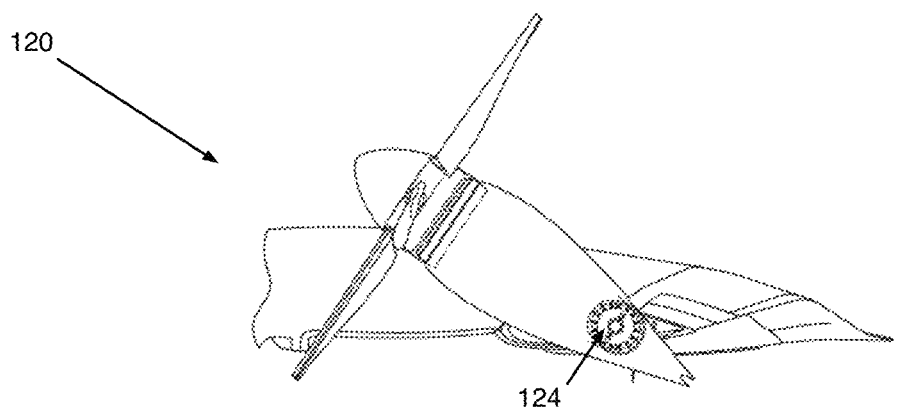
FIG. 19B depicts a variation of the propulsion assembly including a pivot tilt mechanism between a variation of the forward configuration and the hover configuration.
Figure 19C:
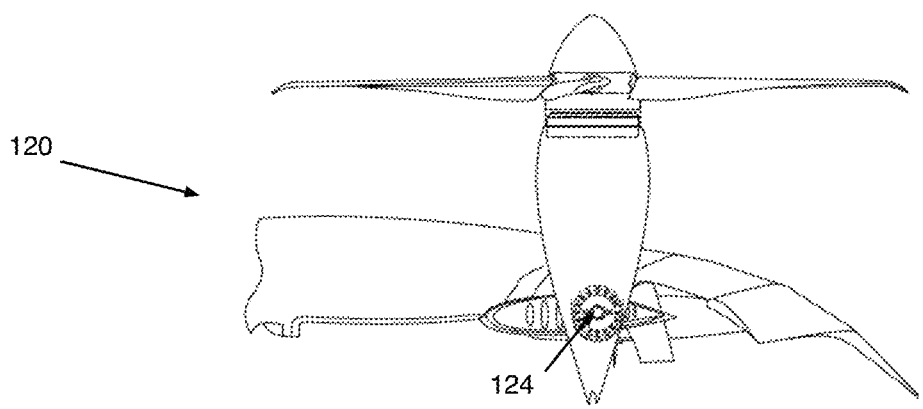
FIG. 19C depicts a variation of the propulsion assembly including a pivot tilt mechanism in a variation of the hover configuration.
Figure 20A:
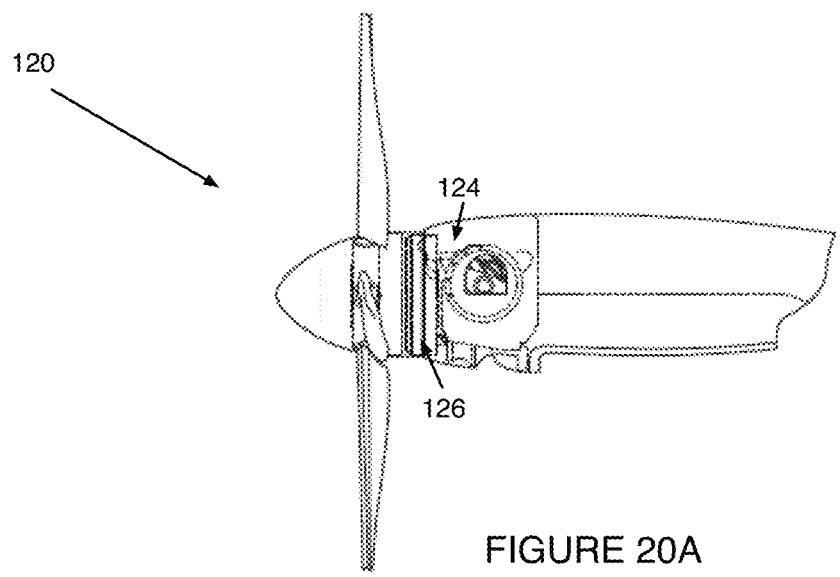
FIG. 20A depicts a variation of the propulsion assembly including a linkage tilt mechanism in a variation of the forward configuration.
Figure 20B:
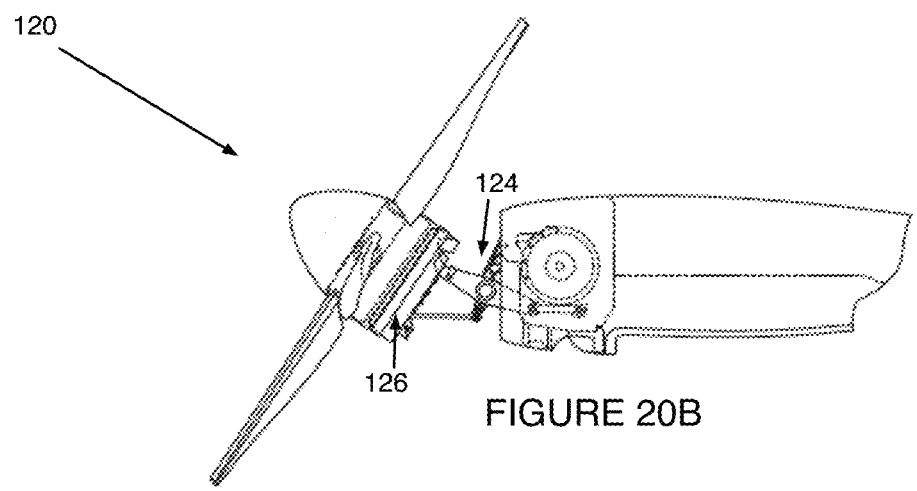
FIG. 20B depicts a variation of the propulsion assembly including a linkage tilt mechanism between a variation of the forward configuration and the hover configuration.
Figure 20C:
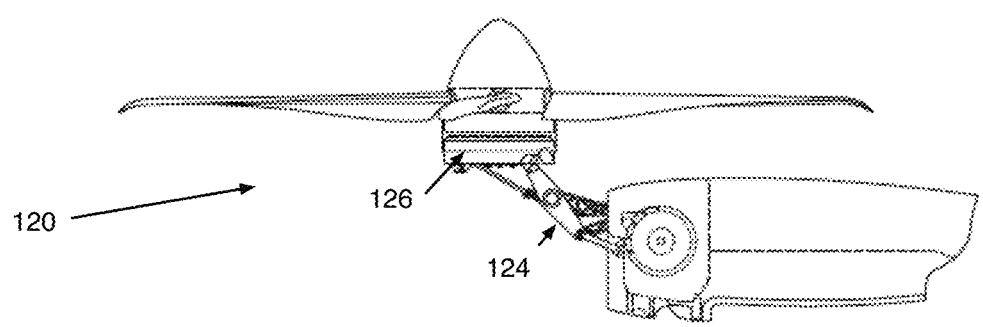
FIG. 20C depicts a variation of the propulsion assembly including a linkage tilt mechanism in a variation of the hover configuration.

In variations including a vee-tail, the vee-tail can be swept forward (e.g., as shown in FIGS. 18A-C]). However, the vee-tail can additionally or alternatively be swept rearward and/or be substantially vertical (e.g., unswept).

The left and right wings function to provide lift during forward flight of the tiltrotor aircraft 100. The wings also function to provide structural support to various components of the aircraft 100 (e.g., one or more propulsion assemblies 120 at one or more propulsion assembly attachment locations). The wing can also function to house components of the tiltrotor aircraft 100, such as power distribution systems (e.g., electrical power cables, batteries, etc.), control instruction distribution components (e.g., electrical signal cables for fly-by-wire control systems, mechanical linkages for manual control systems, etc.), and any other suitable components.

In a first variation, the wing is rigidly fixed to the fuselage 116. In a first specific example, the wing includes a first truss that is coupled to a second truss of the fuselage 116 at one or more wing attachment locations. In a second specific example, the wing and fuselage 116 are composed at least partially of a contiguous material (e.g., a composite material, carbon fiber material, etc.) in lieu of or in addition to a truss. In a second variation, the wing pivots relative to the fuselage 116. In a specific example of the second variation, the tilt mechanism 124 of each of the propulsion assemblies 120 coupled to the wing (e.g., to each of the left and right wing 114) is the mechanism that tilts the wing itself (e.g., a pivot mechanism that rotates the entire wing relative to the fuselage 116). However, the wing and fuselage 116 can be otherwise suitably coupled.

The propulsion assembly attachment locations defined by the airframe 110 function to mechanically couple the propulsion assemblies 120 to the airframe 110. In a first variation, the propulsion assembly attachment point is a rigid attachment that integrates a portion of the propulsion assembly 120 into the airframe 110 (e.g., into the wing); for example, in this variation the tilt mechanism 124 of the propulsion assembly 120 can include a linkage that extends the propeller disc away from and above the portion of the propulsion assembly 120 fixed to the wing. In a second variation, the propulsion assembly attachment point is a portion of a pivot (e.g., one side of a pure pivot mechanism); for example, in this variation the tilt mechanism 124 of the propulsion assembly 120 can include a pivot that rotates the propulsion assembly 120 as a whole relative to the wing (e.g., at a tip of the wing).

Figure 12:
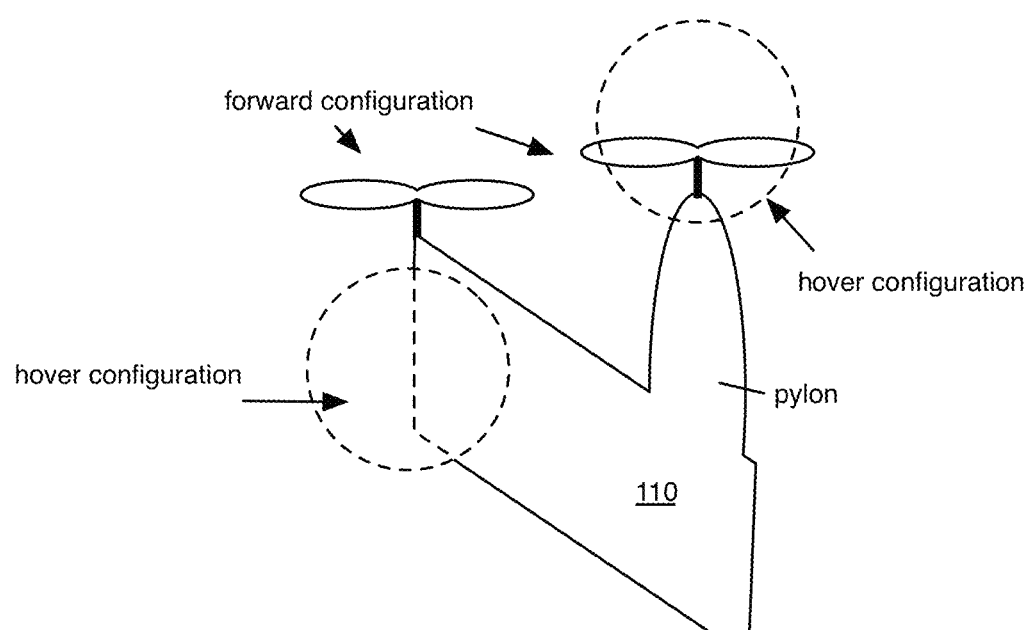
FIG. 12 depicts relative orientations of the wing and propeller in the forward and hover configurations in an example embodiment of the aircraft including a swept wing and an example embodiment of the propulsion assembly including a linkage.

In examples, the airframe 110 can include pylons that extend away from the wings, fuselage 116, and/or empennage 118 that define propulsion assembly attachment locations. The pylons can adjust the fixed position of the propulsion assemblies 120 from which they transform between the forward and hover configurations. For example, as shown in FIGS. 12 and 17A, the pylons can extend forward from the inboard positions of the left and right wings to extend the inboard propulsion assemblies 120 forward of the outboard propulsion assemblies 120 in cases wherein the wings are swept forward, and thus the outboard propulsion assembly attachment locations are forward of the base of the pylons (i.e., where the inboard propulsion assembly attachment locations would be in the absence of a pylon or similar extension member). The pylon preferably extends forward of the wing, and the aircraft 100 preferably includes a left inboard pylon extending forward from the left wing 112 and coupled to the left inboard propulsion assembly 120 and a right inboard pylon extending forward from the right wing 114 and coupled to the right inboard propulsion assembly 120. In such examples, the disc planes of the left inboard propulsion assembly 120 and the right inboard propulsion assembly 120 are displaced forward along the roll axis 20 relative to the disc planes of the left outboard propulsion assembly 120 and the right outboard propulsion assembly 120 in the forward configuration. However, in alternative variations and examples, the pylons can displace the fixed position of the propulsion assembly 120 locations in any suitable direction relative to the airframe 110. In further alternatives, the aircraft 100 can omit pylons and all propulsion assembly attachment locations can be directly upon various portions of the airframe 110.

3.2 Propulsion Assemblies

The tiltrotor aircraft 100 includes a plurality of propulsion assemblies 120 coupled to the airframe 110 at a corresponding plurality of propulsion assembly attachment points. Each propulsion assembly 120 preferably includes include a propeller, a tilt mechanism, and an electric motor. The propulsion assembly 120 functions to house and collocate the propeller, the tilt mechanism, the electric motor, and any other suitable components related to the propeller 122 and electromechanical drive thereof. The tiltrotor aircraft 100 preferably includes an even number of propulsion assemblies 120, and more preferably includes six propulsion assemblies 120; however, the tiltrotor aircraft 100 can additionally or alternatively include an odd number of propulsion assemblies 120, eight propulsion assemblies 120, and any other suitable number of propulsion assemblies 120.

The propeller 122 of the propulsion assembly 120 functions to convert rotational kinetic energy supplied by the electric motor 126 to aerodynamic forces (e.g., for propelling the aircraft 100 in the hover mode, the forward mode, etc.). The propeller 122 can include a number of propeller 122 blades (e.g., blades, airfoils, etc.), a head (e.g., a hub and associated linkages), and any other suitable components. The propeller 122 is preferably a variable-pitch propeller 122 (e.g., wherein the pitch of each propeller 122 blade is variable in coordination such as via collective control, wherein the pitch of each propeller 122 blade is independently variable such as via cyclic control, etc.), but can additionally or alternatively be a fixed-pitch propeller. In some variations, the aircraft 100 can include both variable-pitch and fixed-pitch propeller 122 associated with different propulsion assemblies 120 of the plurality of propulsion assemblies 120. In additional or alternative variations, the propeller 122 can be articulated into a negative angle of attack condition, which can function to produce reverse thrust without changing the direction of rotation of the propeller. The propeller 122 preferably includes five blades per propeller, but can additionally or alternatively include any suitable number of blades per propeller 122 (e.g., two, three, four, six, etc.). The propeller 122 can define any suitable disc area (e.g., propeller disc, disc, etc.), and each blade can define any suitable cross section and/or twist angle as a function of blade span.

In a specific example, each propeller 122 of the plurality of propulsion assemblies 120 includes a set of propeller 122 blades attached to the hub by a variable pitch linkage that rotates each propeller 122 blade about a long axis of the propeller 122 blade and constrains propeller 122 blade motion normal to the disc plane (e.g., the propeller 122 blade does not substantially articulate forward or backward from the disc plane).

The propellers are preferably unenclosed (e.g., without captive blade tips, without an inflow screen, etc.), but in additional or alternative variations can be enclosed (e.g., ducted as in a ducted fan, enclosed within a cowling about the perimeter of the disc area, etc.) and/or include a fixed screen in the inflow and/or outflow path.

Figures 6A, 6B:
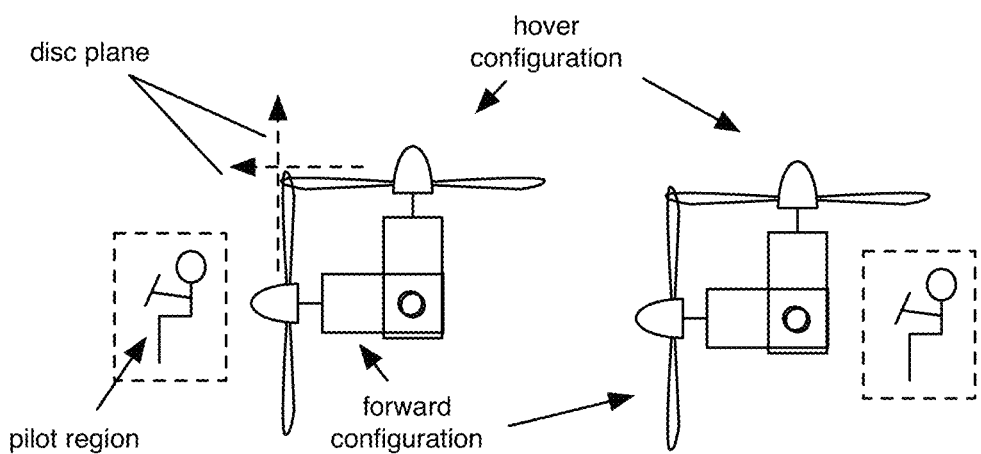
FIGS. 6A-6B depict schematic illustrations of the relative orientations of an example propulsion assembly relative to a pilot of the aircraft in a first configuration wherein the pilot is forward of the propulsion assembly and a second configuration wherein the pilot is aft of the propulsion assembly, respectively.

The tilt mechanism 124 of the propulsion assembly 120 functions to transition the orientation of each propeller 122 between the hover configuration and the forward configuration. The tilt mechanism 124 can also function to restrict the possible motion of the propeller disc such that radial projection of the propeller disc toward the airframe 110 (e.g., the disc plane) in the hover and forward configurations does not intersect any portion the aircraft 100 wherein a pilot is located, as shown in FIGS. 6A and 6B. In the configuration wherein the disc plane is forward of the pilot region in the forward configuration, the disc plane preferably does not intersect the pilot region at each point during transition between the hover and forward configurations, inclusive of the endpoints (e.g., the hover configuration and forward configuration). For example, the inboard propulsion assemblies 120 are preferably oriented such that the disc planes of the left inboard propulsion assembly 120 and the right inboard propulsion assembly 120 intersect the airframe 110 outside a pilot region of the fuselage 116 at each point between the forward configuration and the hover configuration in which the disc planes intersect the airframe 110. However, the propulsion assemblies 120 can be otherwise suitable arranged relative to the pilot region in alternative examples. Transitioning the orientation can include: pitching the propeller disc about an axis parallel to the pitch axis 30 of the aircraft 100; translating a portion of the propulsion assembly 120 (e.g., relative to the propulsion assembly attachment point); rotating the propeller disc about an axis parallel to the yaw axis 10 of the aircraft 100; and any other suitable translation or rotation and/or combination of the aforementioned transition modalities.

The tilt mechanism 124 associated with each propulsion assembly 120 preferably adjusts each propeller 122 between the hover configuration and the forward configuration (e.g., in conjunction with transition of the aircraft 100 between the hover mode and the forward mode); however, in additional or alternative variations, adjustment can be performed by a single tilt mechanism 124 associated with all propellers (e.g., a tilting wing rigidly fixed to each propulsion assembly 120), by a number of tilt mechanisms different from the number of propellers of the plurality of propellers (e.g., wherein a set of six propellers are subdivided into pairs, and each pair is transitioned by a single tilt mechanism 124 between the hover and forward configurations), and/or otherwise suitably performed. In a first variation, the aircraft 100 includes six propellers and six tilt mechanisms, wherein one tilt mechanism 124 of the six tilt mechanisms is associated with one propeller 122 of the six propellers (e.g., the propellers and tilt mechanisms have a one-to-one correspondence). In another variation, two or more propellers of the plurality of propellers are coupled to a single tilt mechanism 124 such that actuation of the single tilt mechanism 124 transitions the two or more propellers between the hover and forward configuration (e.g., wherein two or more propellers are rigidly coupled to a wing, and the tilt mechanism 124 rotates the wing about the pitch axis 30 to operate the aircraft 100 between the hover configuration and the forward configuration).

In variations, the tilt mechanism 124 can displace the entirety of the electric motor 126 and the propeller 122 of the propulsion assembly 120 away from the airframe 110 (e.g., wing, pylon, etc.), relative to the remainder of the propulsion assembly 120. Displacement is preferably performed by a tilt mechanism 124 including a linkage (e.g., as shown in FIGS. 8, 9, and 20A-C); in such variations, the tilt mechanism 124 of at least one of the plurality of propulsion assemblies 120 includes a linkage that displaces the electric motor 126 and propeller 122 parallel to the roll axis 20 in the hover configuration (e.g., forward or rearward from the wing or pylon). In an example of the aircraft 100 in such a variation, the tilt mechanism 124 of the left inboard propulsion assembly 120 and the right inboard propulsion assembly 120 each include a linkage that displaces the electric motor 126 and propeller 122 away from the left wing 112 and the right wing 114, respectively, in the hover configuration.

In additional or alternative variations, the tilt mechanism 124 can rotate the propulsion assembly 120 itself to transition between the forward and hover configurations. In an example of the aircraft 100 in such a variation, the tilt mechanism 124 of the left outboard propulsion assembly 120, the right outboard propulsion assembly 120, the left rear propulsion assembly 120, and the right rear propulsion assembly 120 each include a pivot that rotates each propulsion assembly 120 between the forward configuration and the hover configuration.

However, the aircraft 100 can additionally or alternatively include any suitable number of propellers associated with any suitable number of tilt mechanisms in any suitable manner.

Figure 7:
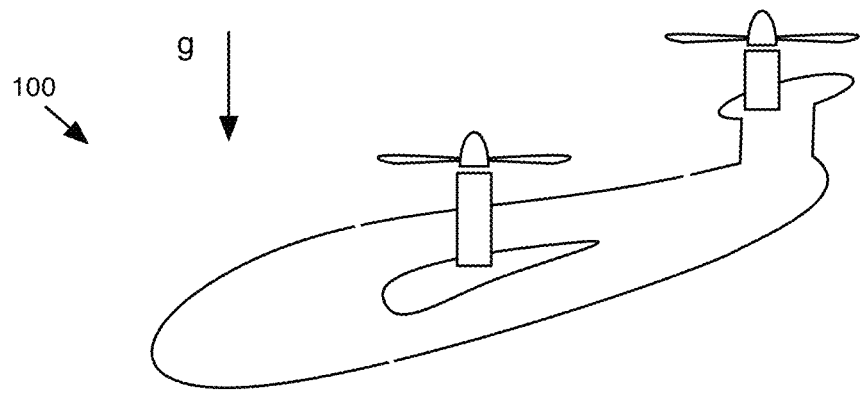
FIG. 7 depicts an example orientation of the aircraft relative to a gravity vector during operation in the hover mode.

The hover configuration functions to enable the propulsion assembly 120 to provide vertical thrust to the aircraft 100 while the aircraft 100 is operating in the hover mode (or in a superposition of the forward and hover modes). The hover configuration can be geometrically defined as the configuration of the propulsion assembly 120 wherein the propeller disc of the propeller 122 is parallel to the plane defined by the longitudinal and lateral axes (e.g., the propeller 122 axis of each propeller 122 is parallel to the vertical axis of the aircraft 100); alternatively, the propeller disc can deviate from parallel (e.g., slightly deviate, substantially deviate, etc.) to this plane in the hover configuration. In some variations, the propeller disc is maintained in an orientation perpendicular to a gravity vector when the propulsion assembly 120 is in the hover configuration (e.g., the propeller disc can deviate from parallel to the aircraft 100 geometry to remain perpendicular to a gravity vector, as shown in FIG. 7).

Figure 8:
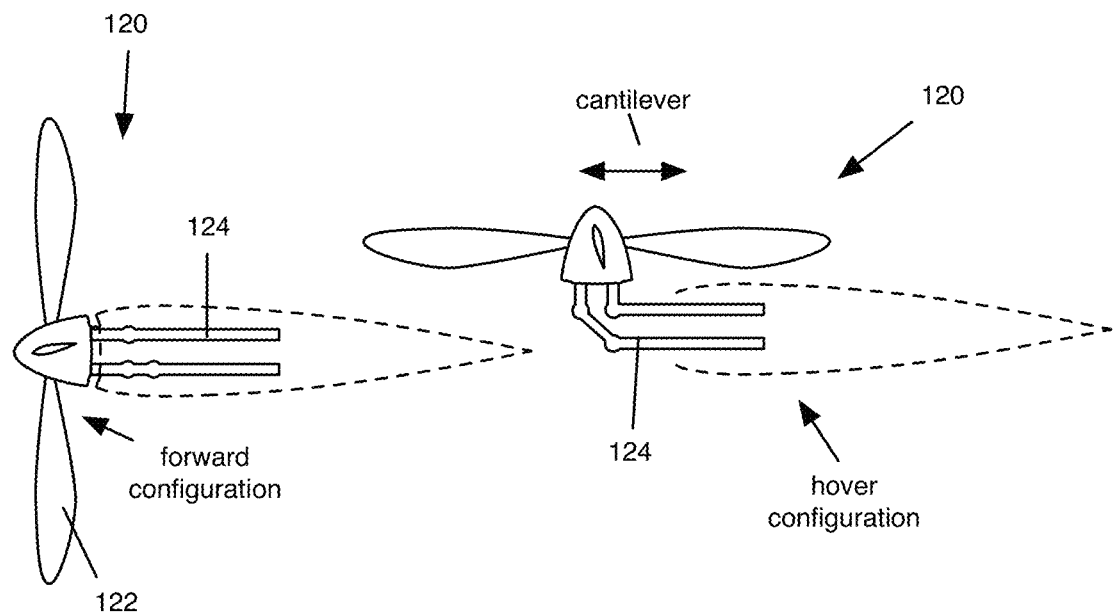
FIG. 8 depicts the forward and hover configurations of an example embodiment of the propulsion assembly including a linkage.
Figure 10:
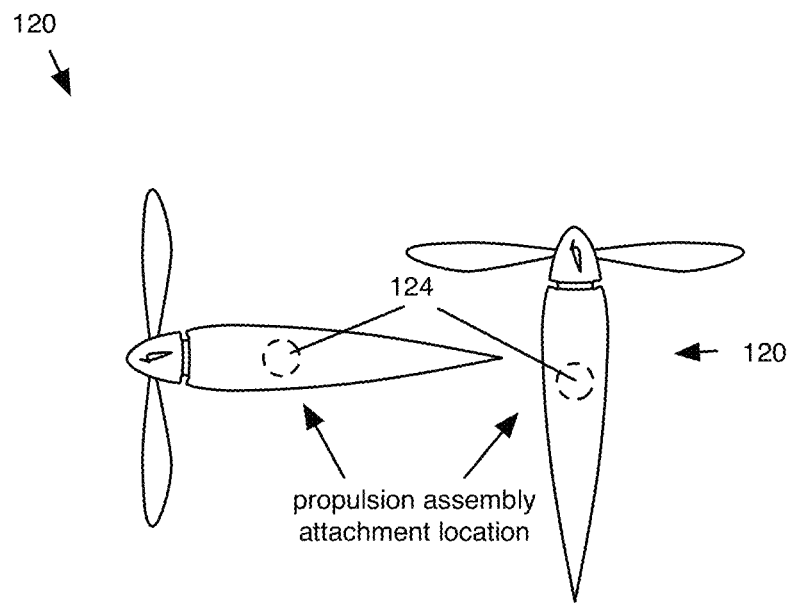
FIG. 10 depicts the forward and hover configurations of an example embodiment of the propulsion assembly including a pivot.

In the hover configuration, the translation of the propeller disc from its location in the forward configuration can be determined by the tilt mechanism. For example, as shown in FIG. 8, the tilt mechanism 124 can include a linkage that cantilevers a portion of the propulsion assembly 120 (e.g., the propeller, the propeller 122 and the electric motor, etc.) away from the propulsion assembly attachment point (e.g., away from the leading edge of the wing, away from the trailing edge of the wing, away from the leading feature of a portion of the tail section, etc.) in order to achieve a desired hover arrangement (e.g., position of the propeller disc relative to other propeller discs of the plurality of propellers). In examples including a linkage, the linkage can include a forward-extension linkage, wherein the linkage translates the propeller disc forward upon transitioning the propeller 122 between the forward and hover configuration; the linkage can also include a reverse-extension linkage, wherein the linkage translates the propeller disc rearward upon transitioning the propeller 122 between the forward and the hover configuration. Forward- and/or reverse-extension linkages can extend the propeller 122 any suitable distance in either the forward or reverse direction, respectively. In some variations, the aircraft 100 can include linkages that extend distinct propellers differing distances, and/or in different directions (e.g., forward, reverse) to achieve a desired hover arrangement. The tilt mechanism 124 can also include a pivot, wherein the propeller disc rotates about the propulsion assembly attachment point and thereby translates in a constrained manner relative to the rotation axis of the pivot, as shown in FIG. 10. However, the orientation of the propeller disc when the propulsion assembly 120 is in the hover configuration can be otherwise suitably defined.

The forward configuration functions to enable the propulsion assembly 120 to provide horizontal thrust to the aircraft 100 while the aircraft 100 is operating in the forward mode (or in a superposition of the forward and hover modes). In the forward configuration, the tilt mechanism 124 transitions the propeller 122 position such that the axis of rotation of each propeller 122 is parallel to the longitudinal axis of the aircraft 100. Furthermore, in the forward configuration, the propeller 122 is preferably arranged such that the cantilever distance between the propulsion assembly attachment point and the hub of the propeller 122 is minimized, as shown by example in FIG. 8; however, the cantilever distance can alternatively be any suitable distance in the forward configuration.

The tilt mechanism 124 can maintain the orientation of the propulsion assembly 120 in any suitable intermediate orientation between that of the hover configuration and the forward configuration. For example, the tilt mechanism 124 can maintain the propulsion assembly 120 orientation such that the propeller 122 axis is pitched at a 45° angle relative to the longitudinal axis. The plurality of tilt mechanisms of the plurality of propellers can independently control the orientation of each propeller; for example, a set of four propulsion assemblies 120 arranged at the wing of the aircraft 100 can be maintained in the forward configuration by corresponding tilt mechanisms associated with each propulsion assembly 120, and a pair of tail-mounted propulsion assemblies 120 can be maintained at a non-zero angle relative to the longitudinal axis.

In some variations, the tilt mechanism 124 couples the entirety of the propulsion assembly 120 to the airframe 110, and transitions (e.g., rotates, repositions, etc.) the propulsion assembly 120 in its entirety between the hover and forward configuration. In other variations, the tilt mechanism 124 transitions a portion of the propulsion assembly 120 (e.g., the propeller 122 and electric motor, solely the propeller, etc.) between the hover and forward configurations. However, the tilt mechanism 124 can additionally or alternatively transition any suitable portion of the propulsion assembly 120 between the hover and forward configurations.

Figure 1C:
FIGS. 1C-1D depict schematic illustrations of a side view of a variation of the aircraft in a hover configuration and a forward configuration, respectively.
Figure 1D:
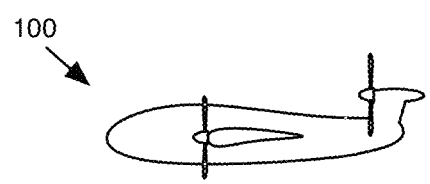
Figure 9:
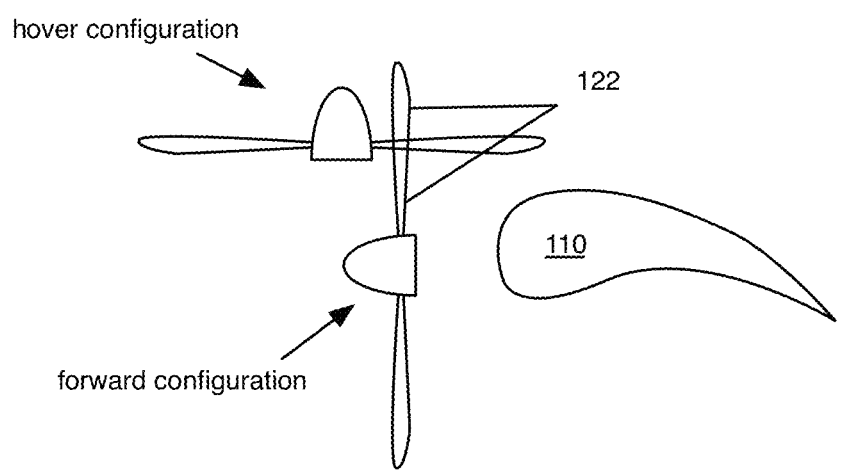
FIG. 9 depicts the relative orientations of the wing and the propeller in an example embodiment of the aircraft, in both the forward and hover configurations of an example of the propulsion assembly including a linkage.

As shown in FIGS. 8 and 20A-C, the tilt mechanism 124 can include a linkage that enables simultaneous translation and rotation (e.g., pitching) of the propeller disc during transition between the hover and forward configurations. The linkage functions to achieve the desired arrangement of the propeller 122 relative to the rest of the plurality of propellers during aircraft 100 operation in hover mode (e.g., a symmetric arrangement, a nearly-symmetric arrangement, a maximally symmetric arrangement given airframe 110 constraints, a pairwise symmetric arrangement about the center of lift or CoG, a download-minimizing arrangement, etc.), and also functions to achieve the desired arrangement of the propeller 122 relative to the airframe 110 during aircraft 100 operation in forward mode (e.g., a minimally-cantilevered arrangement, a wake-free arrangement, etc.). The linkage can also function to reduce download on the aircraft 100 from the downwash of the propeller 122 in the hover configuration by offsetting the propeller disc (e.g., as viewed from above or below) from the projected cross section of the aircraft 100. For example, as shown in FIG. 9, the linkage can offset the propeller disc from the plane of the wing such that the impingement of downwash from the propeller 122 on the surface of the wing is minimized and/or mitigated. However, one or more tilt mechanisms associated with various propellers of the plurality of propulsion assemblies 120 can additionally or alternatively function to offset the propeller discs from any other suitable portion of the aircraft 100 (e.g., fuselage 116, tail section, etc.) and thereby reduce download on the aircraft 100 (e.g., as shown by example in FIGS. 1C, 12, and 13).

In some variations of the aircraft 100, the linkages can function to dynamically adjust the center of thrust by geometrically altering the location of each of the propellers in the hover arrangement. In such variations, the linkage can purely translate the propeller 122 relative to the airframe 110 (e.g., instead of both translating and rotating the propeller 122 between the forward configuration and the hover configuration) parallel to the plane containing the roll axis 20 and the pitch axis 30. In examples, the linkages can dynamically adjust the center of thrust to coincide with the CoG (e.g., in cases where the CoG changes as the occupants and/or cargo load of the aircraft 100 change position, in cases where the CoG changes position as the vehicle is loaded and/or unloaded, etc.). However, such variations can use the linkages to otherwise suitably adjust the relative position of each of the propellers in any other suitable manner and with any other suitable basis.

In a specific example of the aircraft 100, the tilt mechanism 124 of the left inboard propulsion assembly 120 and the right inboard propulsion assembly 120 each include a linkage that displaces the electric motor 126 and propeller 122 away from the left wing 112 and the right wing 114, respectively, in the hover configuration.

Figure 11:
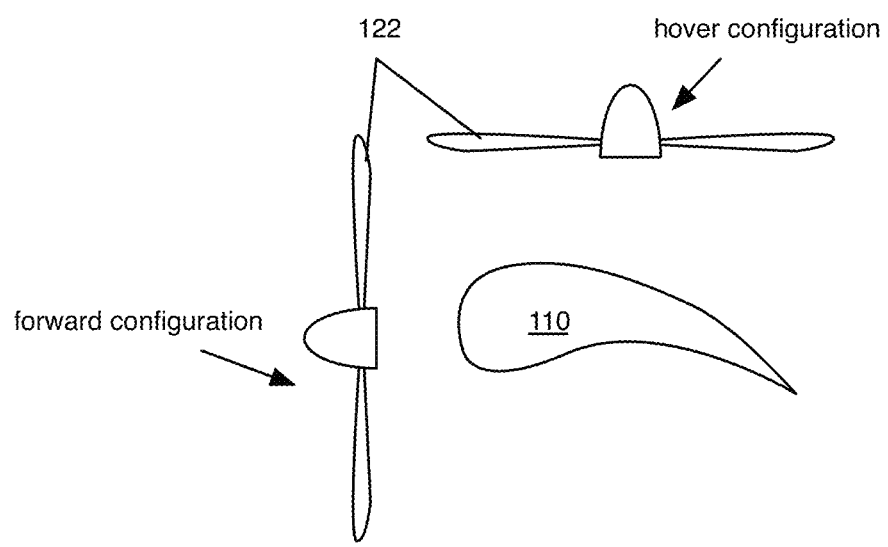
FIG. 11 depicts the relative orientations of the wing and the propeller in an example embodiment of the aircraft, in both the forward and hover configurations of an example of the propulsion assembly including a pivot.

As shown in FIGS. 10 and 19A-C, the tilt mechanism 124 can include a pivot that enables pure rotation of the propulsion assembly 120 about the propulsion assembly attachment point. The pivot functions to achieve the desired arrangement of the propeller 122 relative to the rest of the plurality of propellers during aircraft 100 operation in hover mode (e.g., the desired hover arrangement), and also functions to achieve the desired arrangement of the propeller 122 relative to the airframe 110 during aircraft 100 operation in forward mode (e.g., the desired forward arrangement). The aircraft 100 preferably includes a propulsion assembly 120 coupled to the wing at a wingtip propulsion assembly attachment point by a tilt mechanism 124 including a pivot; however, a tilt mechanism 124 including a pivot can additionally or alternatively be used to couple a propulsion assembly 120 to the airframe 110 at any suitable propulsion assembly attachment point (e.g., a mid-wing point, a tail section point, a nose point, etc.). As shown in FIG. 11, the propeller disc orientation (e.g., as viewed from above or below) can overlap with the position of the wing in the longitudinal axis direction; however, the pivot can be utilized at the wingtip and/or any other suitable portion of the airframe 110 such that the propeller disc minimally overlaps with the projected area of the wing and/or any other suitable portion of the aircraft 100.

In some variations, the tilt mechanism 124 can include a combination of a pivot and a linkage. For example, the tilt mechanism 124 can include a reverse-extension linkage that functions substantially identically to a forward-extension linkage, and a pivot can flip the propulsion assembly 120 (e.g., 180°) and the forward-extension linkage can then extend the propeller disc in the aft direction.

Figure 13:
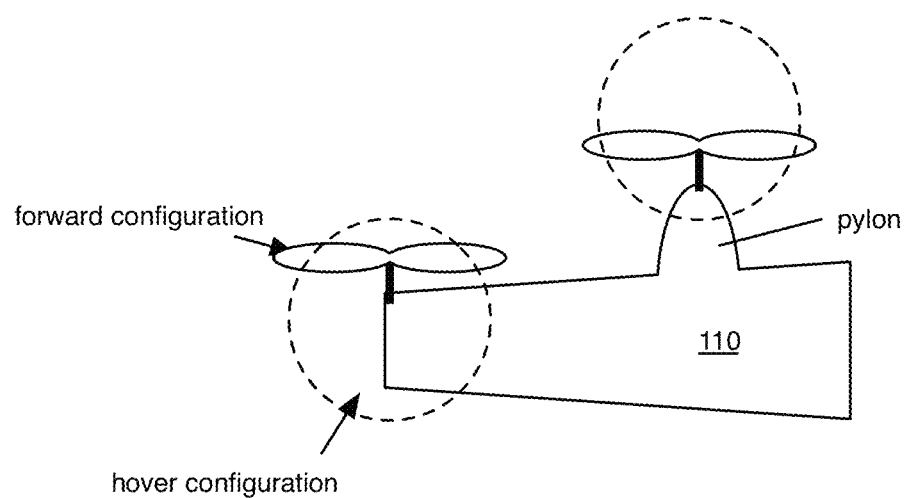
FIG. 13 depicts relative orientations of the wing and propeller in the forward and hover configurations in an example embodiment of the aircraft including a non-swept wing and an example embodiment of the propulsion assembly including a pivot.
Figure 14A:
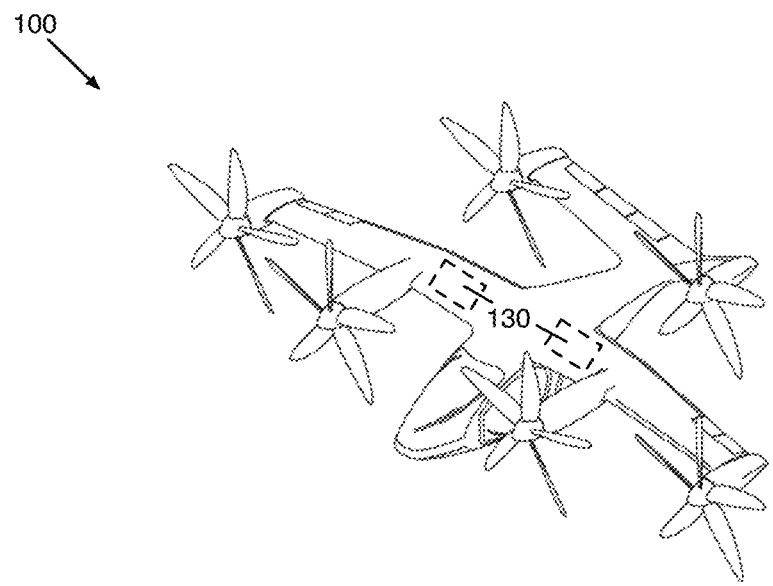
FIGS. 14A-B depict a front perspective view and a rear perspective view, respectively, of an example embodiment of the aircraft in a variation of the forward arrangement.
Figure 14B:
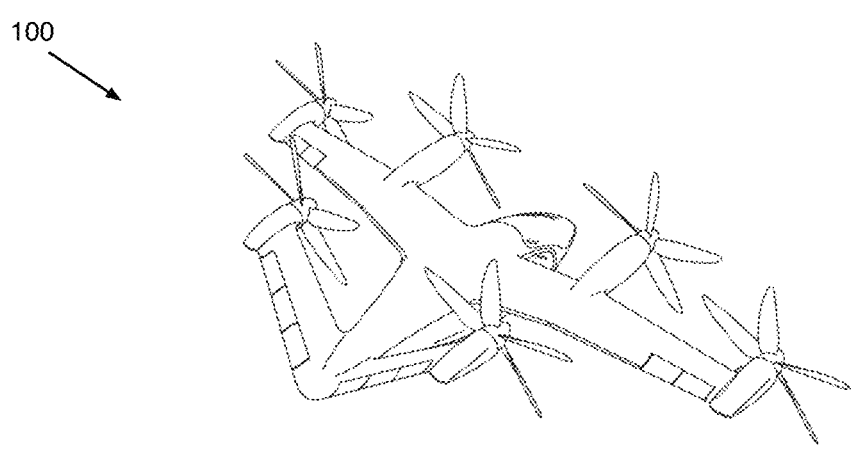
Figure 15A:
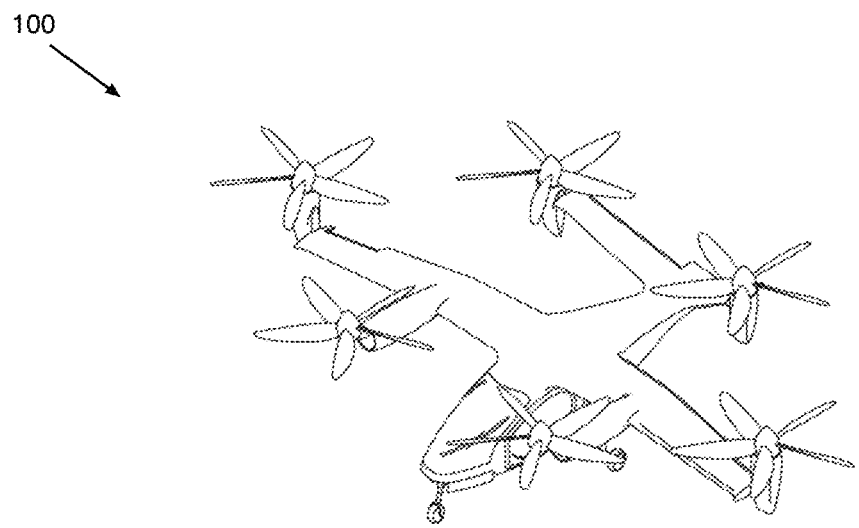
FIGS. 15A-B depict a first perspective view and a second perspective view, respectively, of an example embodiment of the aircraft in a variation of the hover arrangement.
Figure 15B:
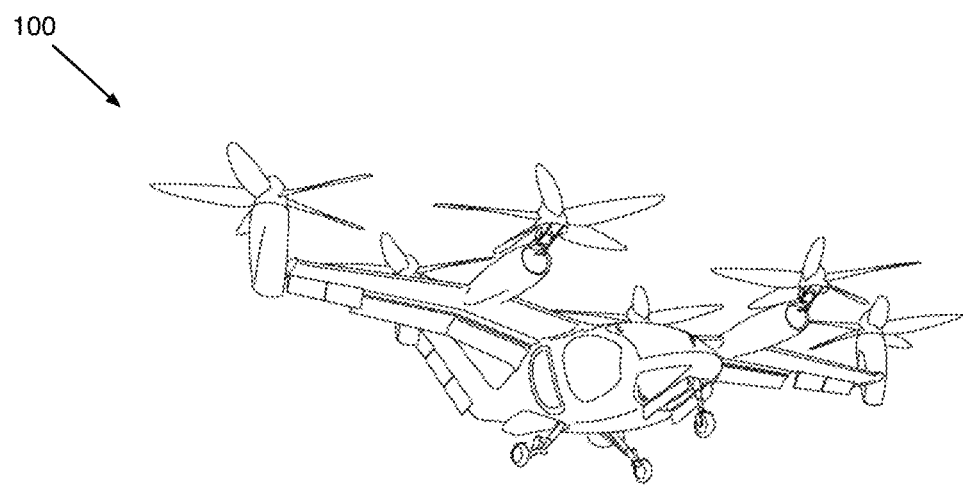

The type of tilt mechanism 124 associated with each propulsion assembly 120 can be based on the desired hover configuration of each propeller 122 of the plurality of propellers, given a desired hover arrangement during aircraft 100 operation in hover mode. For example, as shown in FIG. 12, in an aircraft 100 configuration including a forward swept wing, wingtip propellers can be coupled to the wing by a reverse-extension linkage, and inboard propellers can be coupled to the airframe 110 (e.g., a nacelle or boom of the airframe 110) by a forward-extension linkage, in order to achieve the desired hover configuration of the propeller 122 (e.g., and associated hover arrangement). In another example, as shown in FIG. 13, in an aircraft 100 configuration including a smaller (e.g., zero) forward sweep-angle, wingtip propellers can be coupled to the wing by a pivot, and inboard propellers can be coupled to the airframe 110 (e.g., a nacelle or boom of the airframe 110) by a forward extension linkage, in order to achieve the desired hover configuration of the propeller 122 (e.g., and associated hover arrangement). In some variations, a subset of the plurality of propellers each utilize a first tilt mechanism 124 type, and another subset of the plurality of propellers each utilize a second tilt mechanism 124 type.

In a specific example (e.g., as shown in FIGS. 14A-B and 15A-B), the tiltrotor aircraft 100 includes six propulsion assemblies 120. In this example, a first propulsion assembly 120 is coupled to a left outboard location on the wing (e.g., at the wingtip) by a pivot, a second propulsion assembly 120 is coupled to a right outboard location on the wing by a pivot, a third propulsion assembly 120 is coupled to an inboard region of the wing on the left side and includes a forward-extension linkage, a fourth propulsion assembly 120 is coupled to an inboard region of the wing on the right side and includes a forward-extension linkage, a fifth propulsion assembly 120 is coupled to a left side of the empennage 118 and includes a pivot, and a sixth propulsion assembly 120 is coupled to a right side of the empennage 118 and includes a pivot.

In another specific example, the tiltrotor aircraft 100 includes six propulsion assemblies 120. In this example, a first propulsion assembly 120 is coupled to a left outboard location on the wing (e.g., at the wingtip) by a pivot, a second propulsion assembly 120 is coupled to a right outboard location on the wing by a pivot, a third propulsion assembly 120 is coupled to an inboard region of the wing on the left side and includes a forward-extension linkage, a fourth propulsion assembly 120 is coupled to an inboard region of the wing on the right side and includes a forward-extension linkage, a fifth propulsion assembly 120 is coupled to a left side of the empennage 118 and includes a forward-extension linkage, and a sixth propulsion assembly 120 is coupled to a right side of the empennage 118 and includes a forward-extension linkage.

Figure 16A:
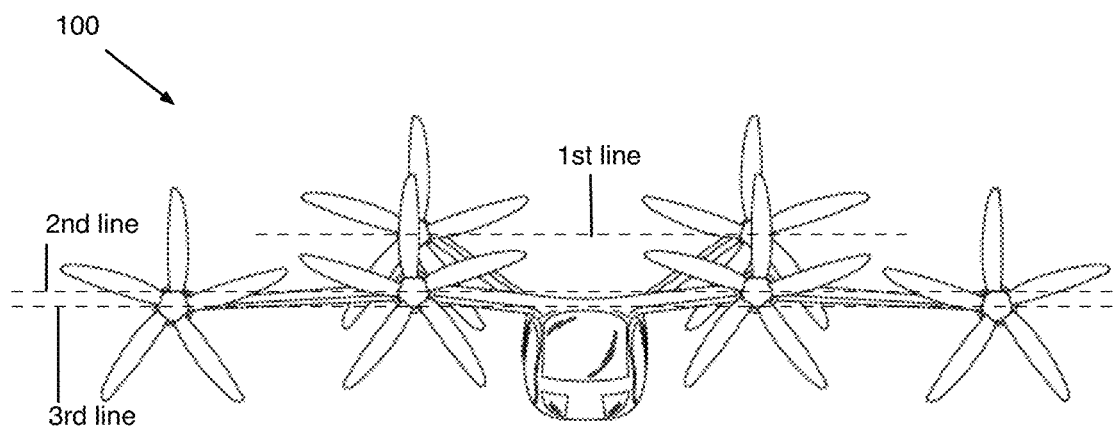
FIGS. 16A-B depict frontal views of an example embodiment of the aircraft in variations of the forward and hover arrangements, respectively.
Figure 16B:
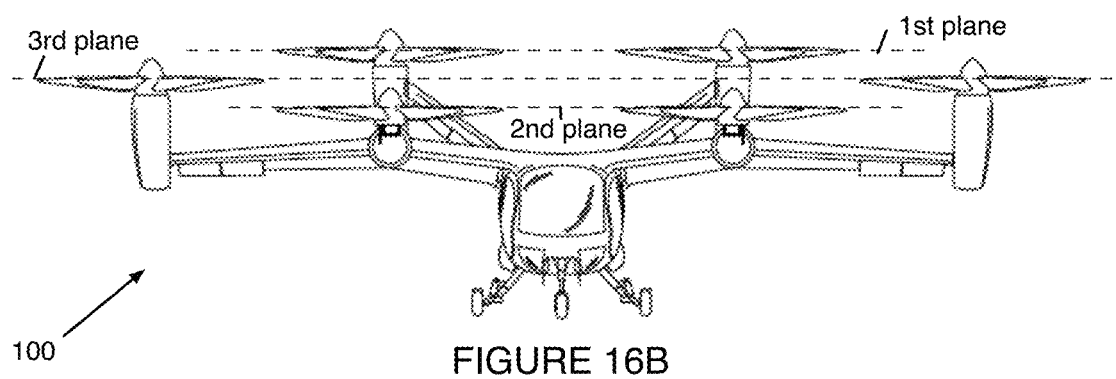

The arrangement of the propulsion assemblies 120 in the hover and forward arrangements can be defined by the planes containing the respective disc areas of each propulsion assembly 120. For example, as shown in FIG. 16B, in the hover arrangement, the disc areas of the left inboard propulsion assembly 120 and the right inboard propulsion assembly 120 can be contained by a first plane, the disc areas of the left outboard propulsion assembly 120 and the right outboard propulsion assembly 120 can be contained by a second plane displaced upward along the yaw axis 10 from the first plane, and the disc areas of the left rear propulsion assembly 120 and the right rear propulsion assembly 120 can be contained by a third plane displaced upward along the yaw axis 10 from the second plane. In this example configuration transitioned into the forward arrangement, as shown in FIG. 17A, the disc areas of the left inboard propulsion assembly 120 and the right inboard propulsion assembly 120 can be contained by a first plane, the disc areas of the left outboard propulsion assembly 120 and the right outboard propulsion assembly 120 can be contained by a second plane displaced rearward along the roll axis 20 from the first plane, and the disc areas of the left rear propulsion assembly 120 and the right rear propulsion assembly 120 can be contained by a third plane displaced rearward along the roll axis 20 from the second plane. In additional or alternative examples, the disc planes can be otherwise suitably displaced relative to one another among the set of propulsion assemblies 120 of the aircraft 100.

The arrangement of the propulsion assemblies 120 in the hover and forward arrangements can be defined by the lines intersecting the respective hubs of the propellers of each propulsion assembly 120. For example, as shown in FIG. 16A, the hubs of the left and right rear propulsion assemblies can be intersected by a first line, the hubs of the left and right inboard propulsion assemblies can be intersected by a second line displaced downward parallel to the yaw axis from the first line, and the left and right outboard propulsion assemblies can be intersected by a third line displaced downward parallel to the yaw axis from the second line in the forward arrangement. In this same example, as shown in FIG. 17B, the hubs of the various propulsion assemblies can be intersected with the same lines as described above in the hover arrangement. However, the arrangements can be otherwise suitably defined (e.g., by disc area, by hub intersection, etc.).

The electric motor 126 functions to convert electrical energy to rotational kinetic energy of the propeller 122 to provide thrust to the aircraft 100. The electric motor 126 can be directly connected to the propeller 122 (e.g., by a shaft), but can alternatively be connected to the propeller 122 through a power transmission linkage (e.g., a gearbox, an offset shaft, a clutch, etc.). In some examples, the electric motor 126 includes a stator and a rotor, and the rotor is integrated into the propeller 122 coupled to the electric motor 126 (e.g., a portion of the propeller 122 defines the rotor that electromagnetically interacts with the stator to rotate the propeller). In alternative variations, the tilt mechanism 124 can function at least in part as a power transmission linkage, such that the electric motor 126 remains fixed relative to the plane of the propeller disc as the propeller disc is transitioned between the forward configuration and the hover configuration.

The electric motor 126 can be an electromagnetic motor, an electrostatic motor, a piezoelectric motor, and any other suitable type of motor that transforms electrical potential energy into rotational kinetic energy. The electric motor 126 can be a self-commutated motor (e.g., a brushed DC motor, a brushless DC motor, a switched reluctance motor, a universal AC-DC motor or commutated electrically excited series or parallel wound motor, etc.) or an externally commutated motor (e.g., an induction motor, a torque motor, a synchronous motor, doubly-fed electric motor, singly-fed electric motor, etc.). In alternative variations, the electric motor 126 can include a coreless rotor motor, an axial rotor motor, a stepper motor, and any other suitable type of electric motor.

The electric motor 126 can include a motor controller electrically coupled to the motor, an electric power source 130 electrically coupled to the motor and the motor controller, and any other suitable components associated with motor operation (e.g., thermal management components, a lubrication mechanism, feedback controller, etc.). The motor controller is preferably retained within the housing of the propulsion assembly 120 (e.g., directly coupled to the motor), but can additionally or alternatively be located elsewhere aboard the aircraft 100 and electrically coupled to the motor in any other suitable manner. The electric power source 130 is preferably retained distal the housing (e.g., at another location on the aircraft 100, coupled to the airframe 110), but can additionally or alternatively be retained within the housing of the propulsion assembly 120 or any other suitable location on the aircraft 100.

The tiltrotor aircraft 100 preferably includes a number of electric motors equal to the number of propellers (e.g., the electric motors and propellers preferably have a one-to-one correspondence), but can additionally or alternatively include any suitable number of electric motors having any suitable correspondence with the number of propellers. Each electric motor 126 of the aircraft 100 is preferably substantially identical; however, in alternative variations, a plurality of electric motors of differing performance characteristics can be used (e.g., torque, efficiency, RPM range, etc.).

3.3 Power Source and Distribution

The electric power source 130 functions to power the propulsion assembly 120 and any other electrically-powered components of the aircraft 100 coupled thereto (e.g., motorized linkages, flight control surface actuators, and any other electrical actuators, sensors, transducers, displays, etc.). The electric power source 130 preferably includes one or more batteries, but can additionally or alternatively include an electrical generator (e.g., a combustion-driven generator, a fuel cell, a photovoltaic generator, etc.). In variations including a generator, the electric power source 130 can include fuel (e.g., contained in an onboard fuel tank) for powering the generator. The electrical power source 130 is preferably located aboard the aircraft 100 distal the propulsion assemblies 120 and electrically connected to power-requiring components by a suitable electrical connection mechanism (e.g., a power distribution system); however, the electrical power source 130 can additionally or alternatively be integrated into the electric motor 126 assembly and therefore the propulsion assembly 120, and thus can be articulated therewith in accordance with variations of the tilt mechanism 124 during operation. In still further alternative variations, the electrical power source 130 can be otherwise suitably arranged at the aircraft 100 relative to the electrically-powered components (e.g., in a distributed manner, in a concentrated manner, etc.) and connected thereto in any other suitable manner.

The tiltrotor aircraft 100 can include a power distribution system that couples the electric power source 130 to each electrically-powered component (e.g., including each electric motor). The power distribution system can include an electrical power transmission bus that distributes power from a plurality of electric power sources (e.g., batteries, battery networks, battery cells, etc.) to components of the aircraft 100 requiring electrical power. Each propulsion assembly 120 is preferably connected to at least one associated electric power source 130 that powers the electric motor 126 assembly of the propulsion assembly 120, and more preferably connected to a plurality of associated electric power sources that each deliver substantially equal amounts of electrical power. However, the electric power sources can additionally or alternatively be interconnected to one another and/or to one or more propulsion assemblies 120 such that any propulsion assembly 120 (or other powered component) can draw electrical power from any suitable subset of electric power sources of the aircraft 100, with any suitable relative power draw between electric power sources.

3.4 Flight Operation Components

The tiltrotor aircraft 100 can include various flight control elements to facilitate flight control and operation, which can include control surfaces 142 and control actuators. For example, the tiltrotor aircraft 100 can include landing gear (e.g., retractable landing gear, fixed landing gear), flight control surfaces (e.g., flaps, elevators, ailerons, rudders, ruddervators, spoilers, slats, air brakes, etc.), flight instruments (e.g., altimeter, airspeed indicator and measurement device, vertical speed indicator and measurement device, compass, attitude indicator and measurement device, heading indicator and measurement device, turn indicator and measurement device, flight director systems, navigational systems, and any other suitable instruments), and any other suitable components. The various components can be coupled to the aircraft 100 in any suitable manner; for example, the flight control surfaces 142 can be coupled to and/or defined by portions of the wing and the tail; the flight instruments can be arranged within a cockpit of the aircraft 100 and/or at a remote operation location (e.g., a teleoperation facility, a remote piloting location, etc.); the landing gear can be arranged at the base of the aircraft 100; etc.

3.5 Additional Specific Examples

Figure 17C:
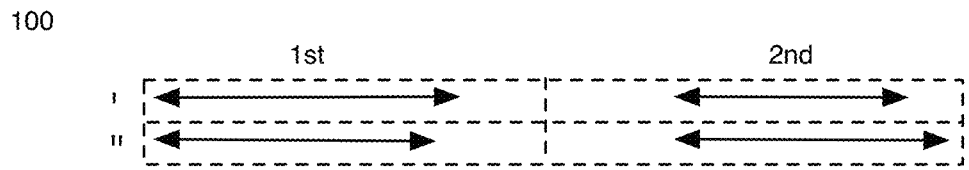
FIG. 17C depicts a table showing the varying inter-hub distances between propulsion assemblies in the variations of the forward and hover arrangements of the example embodiment of the aircraft in FIGS. 17A and 17B.

In a specific example, the aircraft 100 include an airframe 110 that includes a left wing 112, a right wing 114, a fuselage 116, and an empennage 118. The airframe 110 in this example defines a yaw axis 10, a pitch axis 30, and a roll axis 20. The aircraft 100 includes a plurality of propulsion assemblies 120 coupled to the airframe 110 (e.g., at various propulsion assembly attachment locations). Each propulsion assembly 120 includes: an electric motor, a propeller 122 coupled to the electric motor, and a tilt mechanism 124 that connects the propulsion assembly 120 to the airframe 110 and transforms the propulsion assembly 120 between a forward configuration and a hover configuration. Each propeller 122 defines a disc area, a hub at a center of the disc area, and a disc plane containing the disc area (e.g., and extending away from the hub). Each propulsion assembly 120 is operable between a forward configuration and a hover configuration, wherein the disc plane is perpendicular to the roll axis 20 in the forward configuration, and wherein the disc plane is perpendicular to the yaw axis 10 in the hover configuration. In this example, the plurality of propulsion assemblies 120 includes a left outboard propulsion assembly 120 coupled to the left wing 112, a left inboard propulsion assembly 120 coupled to the left wing 112 between the left outboard propulsion assembly 120 and the fuselage 116, a right outboard propulsion assembly 120 coupled to the right wing 114, a right inboard propulsion assembly 120 coupled to the right wing 114 between the right outboard propulsion assembly 120 and the fuselage 116, a left rear propulsion assembly 120 coupled to a left side of the empennage 118, and a right rear propulsion assembly 120 coupled to a right side of the empennage 118. In this example, the positions of the propellers relative to one another differ between the forward and hover arrangement of the aircraft 100 (e.g., the hub of the left inboard propulsion assembly 120 is separated from the hub of the left outboard propulsion assembly 120 by a first distance in the forward arrangement, and by a second distance in the hover arrangement, and similarly for each of the other propulsion assemblies, as shown by example in FIGS. 17A-C).

In a related specific example, the tilt mechanism 124 of the left inboard propulsion assembly 120 and the right inboard propulsion assembly 120 each include a linkage that displaces the electric motor 126 and propeller 122 away from the left wing 112 and the right wing 114, respectively, in the hover configuration.

In a related specific example, the tilt mechanism 124 of the left outboard propulsion assembly 120 and the right outboard propulsion assembly 120 each include a pivot that rotates the left outboard propulsion assembly 120 and the right outboard propulsion assembly 120, respectively, between the forward configuration and the hover configuration. In a related specific example, the tilt mechanism 124 of the left rear propulsion assembly 120 and the right rear propulsion assembly 120 each include a pivot that rotates the left rear propulsion assembly 120 and the right rear propulsion assembly 120, respectively, between the forward configuration and the hover configuration.

In a related specific example, as shown in FIGS. 18A-C, the empennage 118 includes a forward-swept vee-tail, and the left rear propulsion assembly 120 is coupled to a forward-most region of a left side of the forward-swept vee-tail and the right rear propulsion assembly 120 is coupled to a forward-most region of a right side of the forward-swept vee-tail.

In another specific example, the aircraft 100 includes an airframe 110 that includes a left wing 112, a right wing 114, a fuselage 116, and an empennage 118. The airframe 110 defines a yaw axis 10, a pitch axis 30, and a roll axis 20. The aircraft 100 also includes a plurality of propulsion assemblies 120 coupled to the airframe 110, and each propulsion assembly 120 includes an electric motor, a propeller 122 coupled to the electric motor, and a tilt mechanism 124 that connects the propulsion assembly 120 to the airframe 110 and transforms the propulsion assembly 120 between a forward configuration and a hover configuration. Each propeller 122 defines a disc area, a hub at a center of the disc area, and a disc plane containing the disc area, and the disc plane is perpendicular to the roll axis 20 in the forward configuration, and perpendicular to the yaw axis 10 in the hover configuration. Collectively, the plurality of propulsion assemblies 120 is transformable between a forward arrangement and a hover arrangement, (e.g., wherein each of the plurality of propulsion assemblies 120 is in the forward configuration in the forward arrangement, and each of the plurality of propulsion assemblies 120 is in the hover configuration in the hover arrangement), wherein the spacing between at least two of the hubs of the plurality of propulsion assemblies 120 changes between the forward arrangement and the hover arrangement.

Although omitted for conciseness, the preferred embodiments include every combination and permutation of the various system components, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. An aircraft comprising:
  an airframe comprising a fuselage, an empennage, a forward-swept left wing, and a forward-swept right wing, the left and right wings fixed to the fuselage, wherein the airframe defines a yaw axis, a pitch axis, and a roll axis,
  a plurality of propulsion assemblies coupled to the airframe, comprising:
    a left outboard propulsion assembly coupled to the left wing;
    a right outboard propulsion assembly coupled to the right wing;
    a left inboard propulsion assembly coupled to the left wing between the left outboard propulsion assembly and the fuselage;
    a right inboard propulsion assembly coupled to the right wing between the right outboard propulsion assembly and the fuselage; and
    a left rear propulsion assembly coupled to a left side of the empennage, and
    a right rear propulsion assembly coupled to a right side of the empennage, wherein each propulsion assembly of the plurality comprises:
      an electric motor;
      a propeller coupled to the electric motor, wherein the propeller defines a disc area, a hub at the center of the disc area, and a disc plane containing the disc area; and
      a tilt mechanism connecting the electric motor and the propeller to the airframe, the tilt mechanism configured to transform the propulsion assembly between a forward configuration and a hover configuration, wherein the disc plane is perpendicular to the roll axis in the forward configuration, and wherein the disc plane is perpendicular to the yaw axis in the hover configuration;
  wherein in the forward arrangement, the respective hubs of the left and right inboard propulsion assemblies are forward of the respective hubs of the left and right outboard propulsion assemblies, and wherein in the hover arrangement, the respective hubs of the left and right inboard propulsion assemblies are forward of the hub of the respective hubs of the left and right outboard propulsion assemblies, and wherein in the forward arrangement the respective hubs of the left and right inboard propulsion assemblies are higher than the respective hubs of the left and right outboard propulsion assemblies, and wherein in the hover arrangement the respective hubs of the left and right inboard propulsion assemblies are lower than the respective hubs of the left and right outboard propulsion assemblies.

2. The aircraft of claim 1 wherein said left wing and said right wing have an inner portion extending from said fuselage to a midpoint of the wing, and have an outer portion extending from said midpoint to a wing tip, wherein said inner portions of said wings extend upward along said yaw axis in a direction from the fuselage to the midpoint defining the high point of said wings, and wherein said outer portions of said wings extend downward in a direction from said midpoint to the wingtip.

3. The aircraft of claim 1 wherein said left inboard propulsion assembly is coupled to the left wing at a high point of the left wing between the left outboard propulsion assembly and the fuselage and wherein said right inboard propulsion assembly is coupled to the right wing at a high point of the right wing between the right outboard propulsion assembly and the fuselage.

4. The aircraft of claim 3, wherein, in the hover configuration, the left inboard propulsion assembly and the right rear propulsion assembly are substantially equidistant to a center of the aircraft.

5. The aircraft of claim 3, wherein the disc plane of the inboard propulsion assembly intersects the airframe outside a pilot region of the fuselage at each point between the forward configuration and the hover configuration in which the disc planes intersect the airframe.

6. The aircraft of claim 3, wherein, in the hover configuration, the inboard propulsion assemblies and rear propulsion assembles are arranged to minimize a downwash load on the airframe, wherein a top view projection of the disc area of the inboard propulsion assembly is offset forward of a leading edge of said left wing and said right wing, wherein, in the hover configuration, the top view projection of the disc area of the rear propulsion assembly is offset rearward of a trailing edge of said left wing and said right wing.

7. The aircraft of claim 6, wherein the empennage comprises a Vee-tail.

8. The aircraft of claim 7, wherein the Vee-tail is forward swept.

9. The aircraft of claim 1, wherein, in the hover configuration, the left inboard propulsion assembly and the right rear propulsion assembly are substantially equidistant to a center of the aircraft.

10. The aircraft of claim 1, further comprising a plurality of batteries arranged within one or both of said left wing and said right wing, each of the propulsion assemblies electrically connected to one or more of the plurality of batteries.

11. The aircraft of claim 1, wherein the disc plane of the inboard propulsion assembly intersects the airframe outside a pilot region of the fuselage at each point between the forward configuration and the hover configuration in which the disc planes intersect the airframe.

12. The aircraft of claim 1, wherein, in the hover configuration, the inboard propulsion assemblies and rear propulsion assembles are arranged to minimize a downwash load on the airframe, wherein a top view projection of the disc area of the inboard propulsion assembly is offset forward of a leading edge of said left wing and said right wing, wherein, in the hover configuration, the top view projection of the disc area of the rear propulsion assembly is offset rearward of a trailing edge of said left wing and said right wing.

13. The aircraft of claim 1, wherein the empennage comprises a Vee-tail.

14. The aircraft of claim 13, wherein the Vee-tail is forward swept.

\* \* \* \* \*